United States Patent
Lee et al.

(10) Patent No.: US 12,235,781 B2
(45) Date of Patent: Feb. 25, 2025

(54) POWER CONSUMPTION CONTROL FOR TRANSMITTERS OF RETIMERS IN HIGH SPEED DATA COMMUNICATION

(71) Applicant: PARADE TECHNOLOGIES, LTD., San Jose, CA (US)

(72) Inventors: YingFan Lee, Taipei (TW); Mengchuan Gao, Shanghai (CN); Yuanping Chen, San Jose, CA (US); Min She, San Jose, CA (US); Hongquan Wang, Shanghai (CN)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 70 days.

(21) Appl. No.: 18/148,949

(22) Filed: Dec. 30, 2022

(65) Prior Publication Data

US 2024/0220435 A1   Jul. 4, 2024

(51) Int. Cl.
*G06F 13/38* (2006.01)
*G06F 13/40* (2006.01)

(52) U.S. Cl.
CPC ........ *G06F 13/385* (2013.01); *G06F 13/4068* (2013.01)

(58) Field of Classification Search
CPC ............................ G06F 13/385; G06F 13/4068
See application file for complete search history.

(56) References Cited

U.S. PATENT DOCUMENTS 10,102,889 B2 * 10/2018 Bartling .............. G06F 12/0238
11,050,424 B1 * 6/2021 Nagarajan ...... H03K 19/018521
11,831,304 B2 * 11/2023 Xiong .................... H03K 17/16
2004/0268167 A1 * 12/2004 Muljono ............. H04L 25/0292
    713/320
2007/0071111 A1 * 3/2007 Muljono ............. H04L 25/0276
    375/257
2011/0133772 A1 * 6/2011 Shau .................. H03K 19/0008
    327/108
2013/0034199 A1 * 2/2013 Toyotaka ............. G09G 3/3674
    327/407
2013/0194024 A1 * 8/2013 Higashide ................. G06F 1/28
    327/389
2014/0075233 A1 * 3/2014 Bartling .............. G06F 11/1438
    713/324
2014/0125363 A1 * 5/2014 Bock ................ G01R 31/31715
    324/750.01

(Continued)

*Primary Examiner* — Henry Tsai
*Assistant Examiner* — Aurangzeb Hassan
(74) *Attorney, Agent, or Firm* — Morgan, Lewis & Bockius LLP

(57) ABSTRACT

A driver device of a data interface includes an input/output (I/O) interface, a power interface, a transmitter circuit, and a switching unit. The I/O interface is configured to couple to a load device. The power interface is configured to provide a power supply for transmitting data via the I/O interface. The transmitter circuit is coupled to the I/O interface and to the power interface and is configured to be powered by the power supply and provide an output signal to the load device via the I/O interface in a transmitter mode. The switching unit is coupled to the power interface and is configured to switch off the power interface for the transmitter circuit when the transmitter circuit is operating in a low power state. The transmitter circuit has a power consumption level below a threshold power level in the low power state.

20 Claims, 13 Drawing Sheets

(56) References Cited

U.S. PATENT DOCUMENTS

| | | | |
|---|---|---|---|
| 2016/0049936 A1* | 2/2016 | Okamoto | H03K 19/0016 |
| | | | 326/81 |
| 2016/0180923 A1* | 6/2016 | Kamohara | G11C 5/146 |
| | | | 365/156 |
| 2016/0337152 A1* | 11/2016 | Masui | H03B 5/1215 |
| 2017/0131910 A1* | 5/2017 | Paoli | G11C 19/28 |
| 2018/0234122 A1* | 8/2018 | Chou | H04B 1/04 |
| 2022/0392925 A1* | 12/2022 | Ishizu | H10B 12/00 |

* cited by examiner

```
                                                         ┌─1100
                                                         ▼
┌─────────────────────────────────────────────────────────────────────────┐
│ Determine that operation of a transmitter circuit satisfies one or more │
│ low power state criteria. 1102                                          │
│  ┌───────────────────────────────────────────────────────────────────┐  │
│  │ The transmitter circuit is coupled to an I/O interface and a first│  │
│  │ power interface, the I/O interface is configured to couple to a   │  │
│  │ load device, and a first power interface provides a first power   │  │
│  │ supply for transmitting data via the I/O interface. 1104          │  │
│  └───────────────────────────────────────────────────────────────────┘  │
│  ┌───────────────────────────────────────────────────────────────────┐  │
│  │ The transmitter circuit is powered by the first power supply and  │  │
│  │ provides an output signal to the load device via the I/O interface│  │
│  │ in a transmitter mode. 1106                                       │  │
│  └───────────────────────────────────────────────────────────────────┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│   The receiver circuit is coupled to the I/O interface and configured    │
│  | to receive data from the load device in a receiver mode. 1118     |  │
│  │  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │  │
│     A receiver detector is coupled to the I/O interface and a third     │
│  |  | power interface, the third power interface is distinct from the|  |  │
│     | first power interface and is configured to provide the first    │
│  |  | power supply to the receiver detector. The receiver detector is |  |  │
│     | configured to switch off the third power interface and provide  │
│  |  | an auxiliary termination resistor between the I/O interface and |  |  │
│     | a second power supply in the receiver mode. 1120                │
│  |  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  |  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────────┘
                                     │
                                     ▼
┌─────────────────────────────────────────────────────────────────────────┐
│ When operation of the transmitter circuit satisfies one or more low     │
│ power state criteria, switch off the first power interface for the      │
│ transmitter circuit. 1108                                               │
│  ┌───────────────────────────────────────────────────────────────────┐  │
│  │ The transmitter circuit has a power consumption level below the   │  │
│  │ threshold power level in a low power state associated with the one│  │
│  │ or more low power state criteria. 1110                            │  │
│  │  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │  │
│  │   In accordance with the one or more low power state criteria, the  │
│  │  | lower power state is enabled for the transmitter circuit, (1)  |  │  │
│  │   while no data is transmitted via the I/O interface in the         │
│  │  | transmitter mode and (2) when the electronic device operates   |  │  │
│  │   in a receiver mode. 1112                                          │
│  │  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │  │
│  └───────────────────────────────────────────────────────────────────┘  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  │
│   The transmitter circuit includes a plurality of first transistors     │
│  | having first characteristic leakage currents that are greater than|  │
│   a first threshold leakage current. 1114                               │
│  |  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐  |  │
│     | The switching unit includes one or more second transistors    │
│  |  | having second characteristic leakage currents that are less   |  |  │
│     | than a second threshold leakage current that is equal to or    │
│  |  | less than the first threshold leakage current. 1116           |  |  │
│  |  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  |  │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘  │
└─────────────────────────────────────────────────────────────────────────┘
```

Figure 11

POWER CONSUMPTION CONTROL FOR TRANSMITTERS OF RETIMERS IN HIGH SPEED DATA COMMUNICATION

TECHNICAL FIELD

The disclosed embodiments relate generally to data transmission technology, including but not limited to methods, systems, and devices for controlling power consumption of a transmitter circuit in a retimer of a data port that operates under a data communication protocol (e.g., USB4 or DisplayPort).

BACKGROUND

Many electronic devices are physically coupled to each other and communicate with each other using data links and interfaces that comply with high-speed data communication protocols. These data communication protocols allow retimers and redrivers to extend a channel at a high data speed. A redriver is an analog reach extension device designed to boost portions of a signal to counteract attenuation caused by signal propagation over a physical interconnect of a corresponding data link. A retimer is a mixed-signal device that is standard-aware and has the ability to fully recover the data, extract the embedded clock, and retransmit a fresh copy of the data using a clean clock. Compared with a redriver, a retimer actively participates in applying the bus standard to implement negotiation, timeouts, bit manipulation, jitter resetting, signal equalization, skew correction, and many other functions. In some situations, submicron transistors are applied in the retimer to provide high speed switching. Despite their high speed, these submicron transistors often have a large leakage current, which exceeds the power consumption limit (e.g., 1 mW) even when the data interface does not communicate data between a host device and a client device. It would be beneficial to have a more efficient mechanism to control power consumption of a driver device than the current practice, particularly when the driver device needs to operate in a low power state.

SUMMARY

This application is directed to electronic systems, electronic devices, data links, data ports, and data interfaces that control power consumption of a transmitter circuit of a driver device (e.g., a retimer) in a low power state by at least switching off the power interface to a high-power supply of the transmitter circuit. The driver device includes the transmitter circuit and a receiver circuit that shares a common input/output (I/O) interface with the transmitter circuit. The I/O interface is configured to receive a load device physically. The driver device is configured to transmit data to the load device via the transmitter circuit in a transmitter mode and receive data from the load device via the receiver circuit in a receiver mode. The low power state is enabled either while there is no load device physically received at the I/O interface of the driver device in the transmitter mode or while the driver device operates in the receiver mode. In the low power state, the transmitter circuit of the driver device has a power consumption level below a threshold power level (e.g., 1 mW). Additionally, the I/O interface of the driver device is coupled to a termination detector. In the transmitter mode, the termination detector monitors whether the load device is coupled to the I/O interface control switching of the power interface. In the receiver mode, the termination detector optionally provides an auxiliary termination resistor at the I/O interface to facilitate detection of the receiver circuit of the driver device by the load device.

In some embodiments, the transmitter circuit of the driver device includes a plurality of transistors manufactured by a submicron metal-oxide-semiconductor field-effect transistor (MOSFET) process. Such transistors can drive data transmission under a first high speed version of a data communication protocol but suffers from a relatively high leakage current. The high leakage current of these transistors is controlled in the low power state by switching off the power interface of the transmitter circuit. In various embodiments of this application, the power interface for the transmitter circuit is switched off for the transmitter circuit, and power consumption of the transmitter circuit is controlled below a threshold power level (e.g., 1 mW) in spite of the high leakage current of the transistors manufactured by the submicron MOSFET process.

In one aspect, a driver device includes an input/output (I/O) interface, a first power interface, a transmitter circuit, and a switching unit. The I/O interface is configured to couple to a load device. The first power interface is configured to provide a first power supply for transmitting data via the I/O interface. The transmitter circuit is coupled to the I/O interface and to the first power interface and configured to be powered by the first power supply and to provide an output signal to the load device via the I/O interface in a transmitter mode. The switching unit is coupled to a first power interface and configured to switch off the first power interface for the transmitter circuit when the transmitter circuit is operating in a low power state. The transmitter circuit has a power consumption level below a threshold power level in the low power state.

In some embodiments, the lower power state is enabled for the transmitter circuit, when no data is transmitted via the I/O interface in the transmitter mode and when the driver device operates in a receiver mode.

In some embodiments, the transmitter circuit includes a first plurality of transistors having first characteristic leakage currents that are greater than a first threshold leakage current. In some embodiments, the output signal of the transmitter circuit corresponds to a data transmission rate that is greater than a threshold data rate. The first plurality of transistors operate in a submicron region and have a high leakage current greater than a threshold leakage current. The first plurality of transistors are fast, but leaky. In some embodiments, each transistor of the first plurality has a first transistor length that is less than a transistor geometric threshold. Further, in some embodiments, the switching unit includes one or more second transistors having second characteristic leakage currents that are less than a second threshold leakage current, which is equal to or less than the first threshold leakage current.

In another aspect, an electronic device includes an I/O interface, a transmitter circuit, and a switching unit. The I/O interface is configured to couple to a load device. The transmitter circuit is coupled to the I/O interface and configured to be powered by a first power supply and to provide an output signal to the load device via the I/O interface in a transmitter mode. The switching unit is coupled to the transmitter circuit and configured to switch off the first power interface locally for the transmitter circuit when the transmitter circuit is operating in a low power state. The transmitter circuit has a power consumption level below a threshold power level in the low power state.

In yet another aspect, a method is implemented to control power consumption of a driver device. The method includes determining that operation of a transmitter circuit satisfies one or more low power state criteria. The transmitter circuit is coupled to an I/O interface and to a first power interface. The I/O interface is configured to couple to a load device. The first power interface is configured to provide a first power supply for transmitting data via the I/O interface. The transmitter circuit is configured to be powered by the first power supply and to provide an output signal to the load device via the I/O interface in a transmitter mode. The method further includes, when operation of the transmitter circuit satisfies one or more low power state criteria, switching off a first power supply for the transmitter circuit. The transmitter circuit has a power consumption level below a threshold power level in the low power state.

In one aspect, a method is implemented to provide a driver device. The method includes providing an input/output (I/O) interface configured to couple to a load device and to provide a first power interface configured to provide a first power supply for transmitting data via the I/O interface. The method further includes a transmitter circuit coupled to the I/O interface and to the first power interface. The transmitter circuit is configured to be powered by the first power supply and to provide an output signal to the load device via the I/O interface in a transmitter mode. The method further includes a switching unit coupled between the first power interface and the transmitter circuit. The switching unit is configured to switch off the first power interface for the transmitter circuit when the transmitter circuit is operating in a low power state. The transmitter circuit has a power consumption level below a threshold power level in a low power state associated with the one or more low power state criteria.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 11 is a flow diagram of a method for controlling power consumption of a driver device, in accordance with some embodiments.

Like reference numerals refer to corresponding parts throughout the several views of the drawings.

DESCRIPTION OF EMBODIMENTS

Figure 1A:
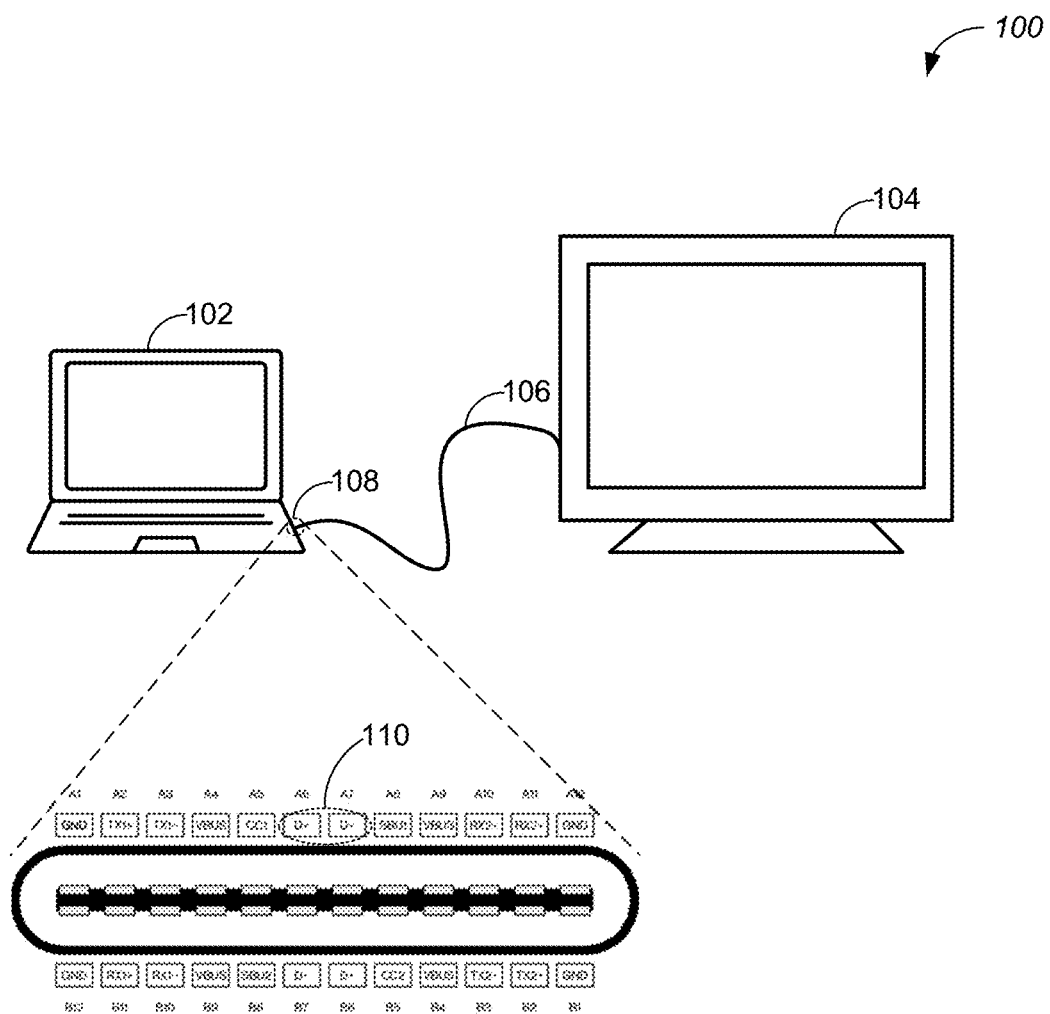
FIG. 1A is a block diagram of an example electronic system in which a first electronic device is electrically coupled to a second electronic device via a data link, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

This application is directed to electronic systems, electronic devices, data links, data ports, and data interfaces that controls power consumption of transmitter circuit of a driver device (e.g., a retimer) in a low power state by at least switching off a power interface of the transmitter circuit. In some embodiments, the transmitter circuit includes a plurality of transistors manufactured by a submicron MOSFET process. Such transistors can drive data transmission under a data communication protocol requiring a relatively high data rate, while suffering from a relatively high leakage current. The high leakage current of these transistors is controlled in the low power state by switching off a power interface of the transmitter circuit. In various embodiments of this application, as the power interface of the transmitter circuit is switched off for the transmitter circuit, power consumption of the driver device is controlled below a threshold power level (e.g., 1 mW) in spite of the high leakage current of the transistors manufactured by the sub-micron MOSFET process.

The driver device is configured to operate in both a transmitter mode and a receiver mode. The transmitter circuit and receiver circuit of the driver device share a common I/O interface, which is configured to receive a load device physically. The low power state is enabled either while there is no load device physically received at the I/O interface of the driver device in the transmitter mode or while the driver device operates in the receiver mode. A termination detector is coupled to the I/O interface. In the transmitter mode, the termination detector is configured to monitor whether the load device is attached to the I/O interface (e.g., every 12 ms) and control switching of the power interface. In the receiver mode, the termination detector optionally provides an auxiliary termination resistor at the I/O interface to facilitate detection of the receiver circuit of the driver device by the load device.

Under some circumstances, a data port is implemented under a first high speed version of a data communication protocol (e.g., USB 4 2.0, DisplayPort v2.0). Although operation of the data port is compatible with a second low speed version of the data communication protocol (e.g., USB 3.x, DisplayPort v1.0), no extra low speed or low power signal pins are provided to facilitate data communication between a host device and an electronic device under the second low speed version of the data communication protocol. Instead, such low speed and how power data communication has to rely on the same signal pins applied to data communication under the first high speed version of the data communication protocol. In the low power mode, power consumption of the driver device is controlled below the threshold power level (e.g., 1 mW), and a leakage current of the driver device is controlled below a threshold leakage level (e.g., 1 µA) for both the first high speed version and second low speed version of the data communication protocol by at least switching off the power interface for the transmitter circuit of the driver device.

FIG. 1A is a block diagram of an example electronic system 100 in which a first electronic device 102 is electrically coupled to a second electronic device 104 via a data link 106, in accordance with some embodiments. The first electronic device 102 and second electronic device 104 are configured to exchange data via the data link 106. In an example, the first electronic device 102 includes a video source, and the second electronic device 104 includes a display device. The display device has a screen configured to display visual content provided by the first electronic device 102 via the data link 106. In another example, the first electronic device 102 includes a desktop computer, and the second electronic device 104 includes a mouse controller that is controlled by the desktop computer via the data link 106. Examples of the electronic devices 102 and 104 include, but are not limited to, a desktop computer, a laptop computer, a tablet computer, a video player, a camera device, a gameplayer device, or other formats of electronic devices which are configured to provide data or receive data. Video data, audio data, control data, configuration data, or any other data are transmitted between the first and second electronic devices 102 and 104 via the data link 106.

The data link 106 includes two connectors 108 at two of its ends. The two connectors 108 are configured to connect the data link 106 to respective connectors 108 of the first electronic device 102 and second electronic device 104. For example, the connector 108 is a DisplayPort connector having a digital display interface developed by a consortium of personal computer and chip manufacturers and standardized by the Video Electronics Standards Association (VESA). The DisplayPort connector is configured to connect the data link 106 to the first electronic device 102 and carry video, audio, and control data according to a data communication protocol. In another example, the connector 108 is a universal serial bus (USB) connector, e.g., configured to connect a computer to a peripheral device. Exemplary types of the USB connector include, but are not limited to, USB-A, USB-B, USB-C, USB Micro-A, USB Micro-B, USB Mini-B, USB 3.0A, USB 3.0B, USB 3.0 Micro B, and USB Micro-AB. Further, a data communication protocol of USB 4 is applied to communicate data using a USB-C connector, thereby providing a throughput of up to 40 Gbps, power delivery of up to 100 W, support for 4K and 5K displays, and backward compatibility with USB 3.2 and USB 2.

In some embodiments, the connector 108 includes a bidirectional channel for communicating a stream of data between the first and second electronic device 102 and 104. The bidirectional channel of the connector 108 includes two data lanes and a pair of differential pins 110 coupled to the two data lanes. The pair of differential pins 110 are configured to receive a differential input signal from the first electronic device 102 or the second electronic device 104, and the differential input signal carries a serial data command or serial content data (e.g., video or audio data) that are communicated via the two data lanes of the connector 108. As such, the two data lanes and pair of differential pins 110 of the connector 108 are configured to facilitate bidirectional communication between the first electronic device 102 and the second electronic device 104. The bidirectional channel is a data channel or an auxiliary channel. Specifically, the auxiliary channel of the connector 108 is used for communication of additional serial data beyond video and audio data, such as consumer electronics control (CEC) commands. In some embodiments, the pair of differential pins 110 is coupled to a dedicated set of twisted-pair wires configured to carry two input signals of the differential input signal.

Each connector 108 of the data link 106 is configured to be coupled to a respective connector 108 of the first electronic device 102 and a respective connector 108 of the second electronic device 104. Each connector 108 of the data link 106 is bidirectional, so is each respective connector 108 of the electronic devices 102 and 104. When the connector 108 of the data link 106 is coupled to the first or second electronic device 102 or 104, the pair of differential pins 110 of the connector 108 of the data link 106 are physically and electrically coupled to a pair of differential pins 110 of the connector 108 of the first or second electronic device 102 or 104. The pair of differential pins 110 of the connector 108 of the first or second electronic device 102 or 104 is configured to receive data from, and transmit data to, the differential pins 110 of the connector 108 of the data link 106.

In some embodiments, each connector 108 of the data link 106 and electronic devices 102 and 104 is associated with (e.g., provides an I/O interface to) a driver device having both transmitter circuit and receiver circuit. The transmitter circuit is configured to generate a differential output signal and transmit the differential output signal via the pair of differential pins 110 of the respective connector 108. The receiver circuit is configured to receive a differential input signal via the pair of differential pins 110 of the respective connector 108 for further processing by the driver device. In other words, the driver device associated with the connector 108 of the data link 106 and electronic devices 102 and 104 has a transmitter mode and a receiver mode. The pair of differential pins 110 of the data link 106 or electronic device 102 or 104 is used to output a differential output signal or receive a differential input signal.

Figure 1B:
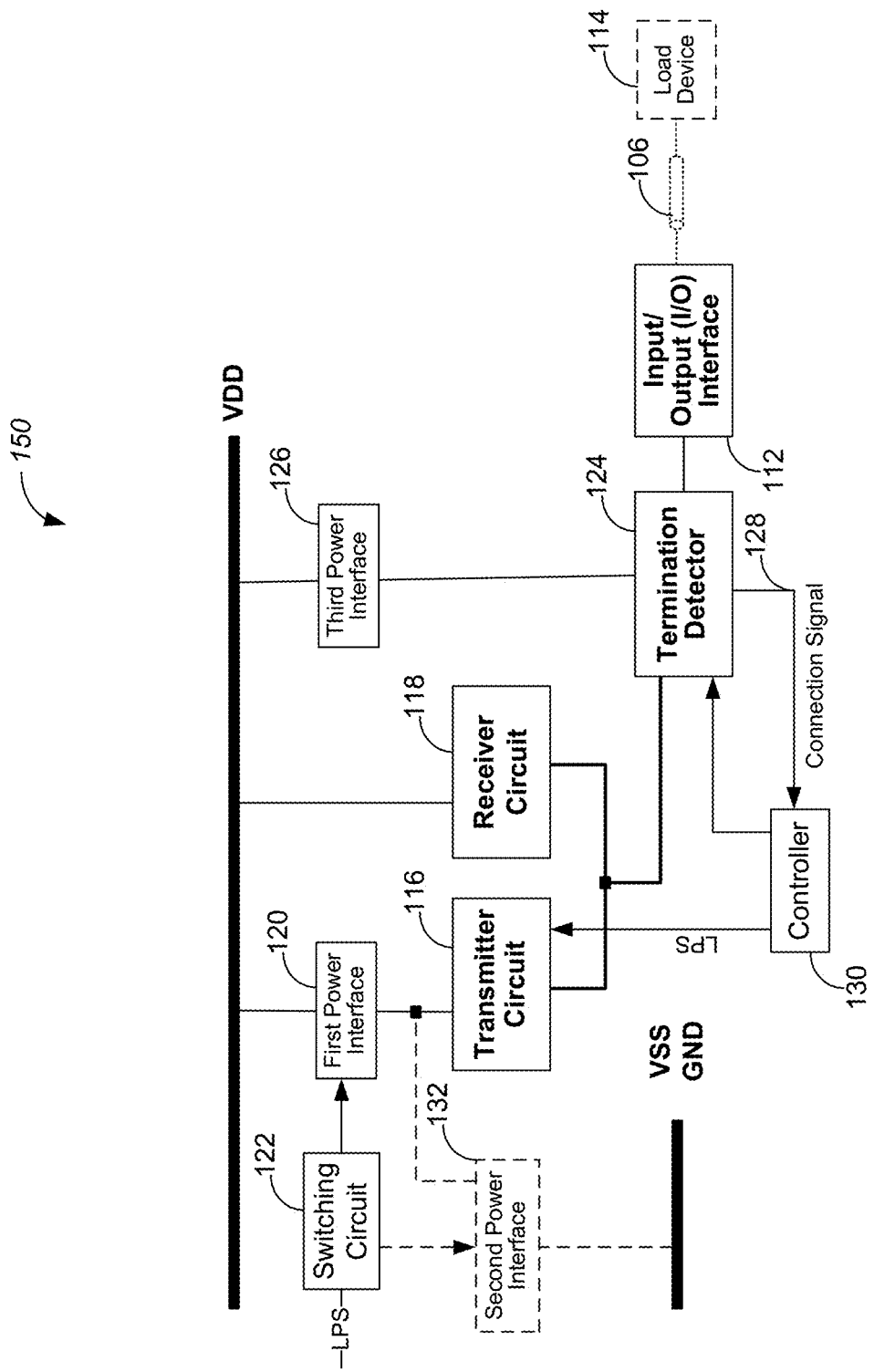
FIG. 1B is a block diagram of a driver device (e.g., part of a retimer) of a data link or an electronic device, in accordance with some embodiments.

FIG. 1B is a block diagram of a driver device 150 of a data link 106 or an electronic device 102 or 104, in accordance with some embodiments. In some embodiments, the driver device 150 in part of a retimer, which is a mixed-signal device that is standard-aware and has an ability to fully recover the data, extract the embedded clock, and retransmit a fresh copy of the data using a clean clock. Each connector 108 of the data link 106 and electronic devices 102 and 104 is associated with a respective driver device 150. The driver device 150 includes an input/output (I/O) interface 112 (e.g., associated with the differential pin 110) configured to couple to a load device 114, transmitter circuit 116, and receiver circuit 118. In an example, the I/O interface 112 includes the connector 108 of the data link 106 or electronic device 102 or 104. For the driver device 150 of the first electronic device 102, the load device 114 is the second electronic device 104 or the data link 106, and the transmitter and receiver circuit 116 and 118 are configured to provide data to, and receiver data from, the load device 114, respectively. A first power interface 120 is configured to provide a first power supply for transmitting data via the I/O interface 112. In an example, the first power supply corresponds to a high-end power supply VDD, e.g., having a voltage level at 1.5V.

The transmitter circuit 116 is coupled to the I/O interface 112 and first power interface 120, and is configured to be powered by the first power supply and provide an output signal to the load device 114 via the I/O interface 112 in a transmitter mode. A switching unit 122 is coupled to the first power interface 120 and configured to switch off the first power interface 120 for the transmitter circuit 116 in accordance with a determination that the transmitter circuit 116 is operating in a low power state. The transmitter circuit 116 has a power consumption level below a threshold power level (e.g., 1 mW) in the low power state. In some embodiments, the lower power state is enabled for the transmitter circuit 116, while no data is transmitted via the I/O interface 112 in the transmitter mode or when the driver device operates in the receiver mode.

In some embodiments, the receiver circuit 118 is coupled to the I/O interface 112 and configured to receive data from the load device 114 in the receiver mode. The transmitter circuit 116 is configured to operate in the low power state in the receiver mode, and the switching unit 122 is configured to switch off the first power interface 120 for the transmitter circuit in the receiver mode. Further, in some embodiments, a termination detector 124 is coupled to the I/O interface 112 and a third power interface 126. The third power interface 126 is distinct from the first power interface 120 and configured to provide the first power supply VDD to the termination detector 124. The termination detector 124 is configured to switch off the third power interface 126. In some situations, the termination detector 124 also provides an auxiliary termination resistor (e.g., having resistance of 50 ohm) between the I/O interface 112 and a second power supply in the receiver mode. Additionally, the termination detector 124 is configured to detect whether the load device 114 is coupled to the I/O interface and generate a connection signal 128 indicating whether the load device 114 is coupled to the I/O interface 112 in the transmitter mode. A controller 130 is coupled to the switching unit 122, transmitter circuit 116, and termination detector 124, and configured to control the switching unit 122 and some intermediate nodes of the transmitter circuit 116 based on the connection signal 128 in the transmitter mode.

In some embodiments, a second power interface 132 provides the second power supply for transmitting the data via the I/O interface 112. The transmitter circuit 116 is powered by both the first and second power supplies. The switching unit 122 is coupled to the first power interface 120, the second power interface 132, and the transmitter circuit 116. In the low power state, the switching unit 122 switches off the first power interface 120 and switches on the second power interface 132 for the transmitter circuit 116 that operates in the low power state. For example, the first and second power supplies correspond to a high-end power supply VDD (e.g., 1.5V) and a low-end power supply VSS (e.g., −1.5V). The switching unit electrically decouples the transmitter circuit 116 from the high-end power supply VDD and couples the transmitter circuit to the low-end power supply VSS in the low power state. In another example, the first and second power supplies correspond to a high-end power supply VDD (e.g., 1.5V) and a ground supply GND (e.g., 0V). The switching unit 122 electrically decouples the transmitter circuit 116 from the high-end power supply VDD and couples the transmitter circuit 116 to the ground supply GND in the low power state.

Figure 2A:
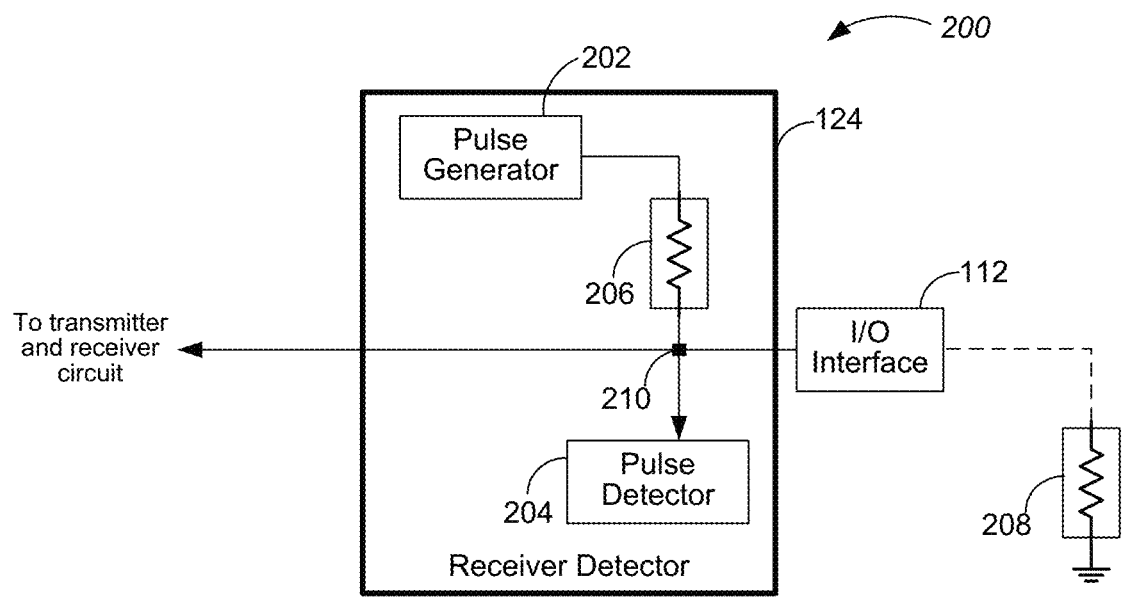
FIGS. 2A and 2B are block diagrams of a load detection system configured to detect a load device in a transmitter mode or in a receiver mode, in accordance with some embodiments.
Figure 2B:
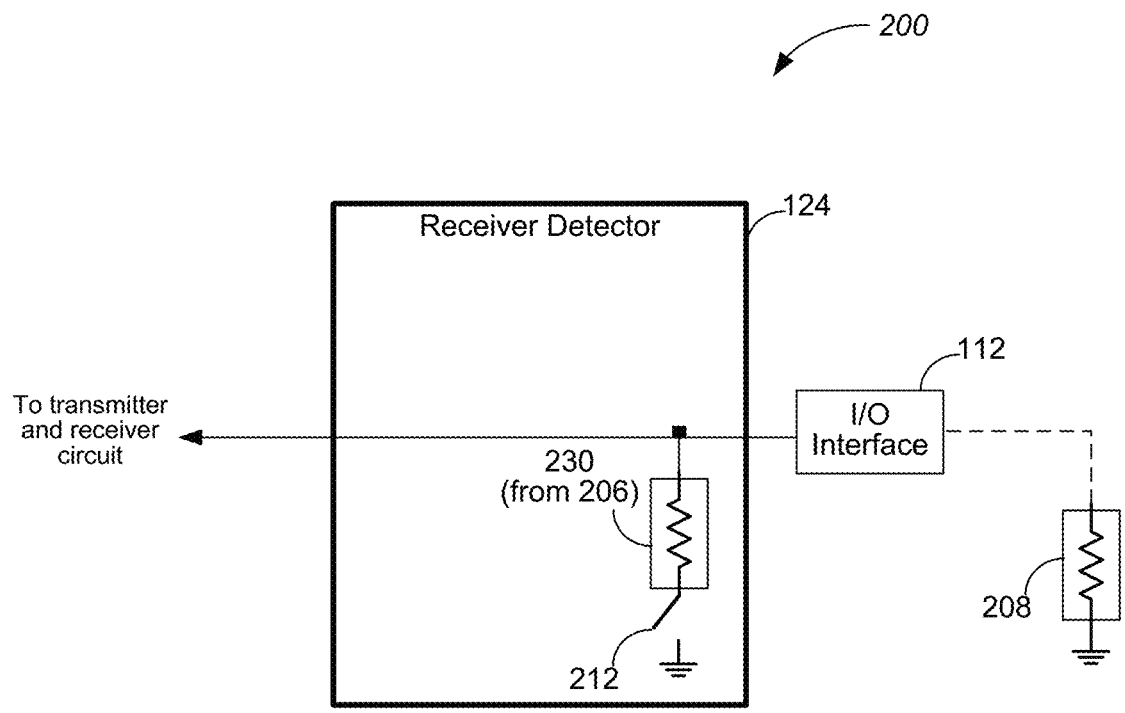
Figure 2C:
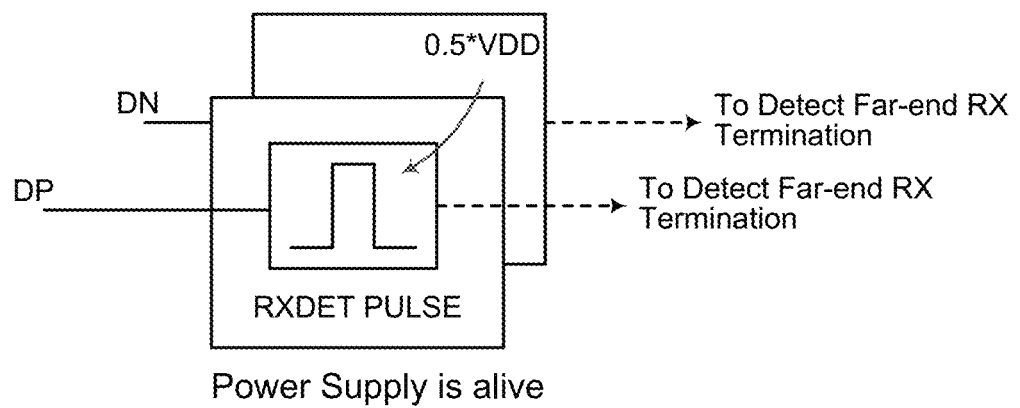
FIG. 2C is a diagram of a pulse signal applied to detect a load device by a termination detector, in accordance with some embodiments.

FIGS. 2A and 2B are block diagrams of a load detection system 200 configured to detect a load device 114 in a transmitter mode or in a receiver mode, in accordance with some embodiments, respectively. FIG. 2C is a diagram of a pulse signal 280 applied to detect a load device 114 by a termination detector 124, in accordance with some embodiments. The load detection system 200 is coupled to a pair of differential pins 110 and configured to detect whether a connector of a first electronic device 102 is connected to a data link 106 or a second electronic device 104. The load detection system 200 includes an I/O interface 112 and a termination detector 124. The termination detector 124 includes a pulse generator 202, a pulse detector 204, and a resistive unit 206. In some situations, the driver device 150 operates in the transmitter mode, and the load device 114 (e.g., the data link 106) is connected to provide a termination resistor 208 having resistance of 50 ohm. The resistive unit 206 and termination resistor 208 are arranged in series to form a voltage divider driven by the pulse generator 202. The pulse generator 202 generates a drive pulse according to a pulse frequency (e.g., every 12 ms). The drive pulse has a pulse amplitude (e.g., equal to a difference between the first and second power supplies) and a pulse width. The pulse detector 204 is coupled to an intermediate node 210 in the voltage divider, and detect an output pulse having an amplitude equal to a portion of the pulse amplitude. A pulse width of the output pulse is distinct from the pulse width of the drive pulse. In an example (FIG. 2C), the termination resistor 208 has a resistance of 50 ohm, so does the resistive unit 206. The output pulse has an amplitude equal to a half of the pulse amplitude.

In some situations, the load device 114 is not connected to the I/O interface 112. The termination resistor 208 does not exist, and the I/O interface 112 is left unconnected to the termination resistor 208. The pulse generator 202 generates the drive pulse according to the pulse frequency (e.g., every 12 ms). The pulse detector 204 coupled to the node 210 detects an output pulse having the same amplitude equal to the pulse amplitude.

Referring to FIG. 2B, in some embodiments, the receiver circuit 118 (FIG. 1B) is enabled to receive data from the I/O interface 112 in the receiver mode, and the transmitter circuit 116 is disabled from transmitting data to the I/O interface 112. In the receiver mode, the pulse generator 202 and pulse detector 206 (FIG. 2A) are disabled. In some embodiments, the transmitter circuit 116 keeps a low resistance path to the second power supply, and uses a main termination resistor 330 coupled to the I/O interface 112. The termination detector 124 does not need to provide an auxiliary termination resistor 230. Alternatively, in some embodiments, the transmitter circuit 116 is decoupled from the first power supply VDD and does not provide any termination resistance (e.g., in FIG. 5). The termination detector 124 provides an auxiliary termination resistor 230. Specifically, the resistive unit 206 is decoupled from the pulse generator 202 and pulse detector 204, and controlled by a switch 212 to couple to a second power supply. By these means, in the receiver mode, the termination detector 124 is configured to provide the resistive unit 206 coupled between the I/O interface 112 and the second power supply, thereby allowing a termination detector 124 of the load device 114 to function as an auxiliary termination resistor 230 and facilitate detecting existence of the a data link 106 or an electronic device 102 or 104.

Additionally, in the receiver mode, the driver device 150 including the termination detector 124 operates in a low power state. The pulse generator 202 and pulse detector 204 is electrically coupled to the first power supply VDD with a third power interface 126 (FIG. 1B). The third power interface 126 is switched off for the pulse generator 202 and pulse detector 204 to further reduce a power consumption level of the driver device 150.

Figure 3:
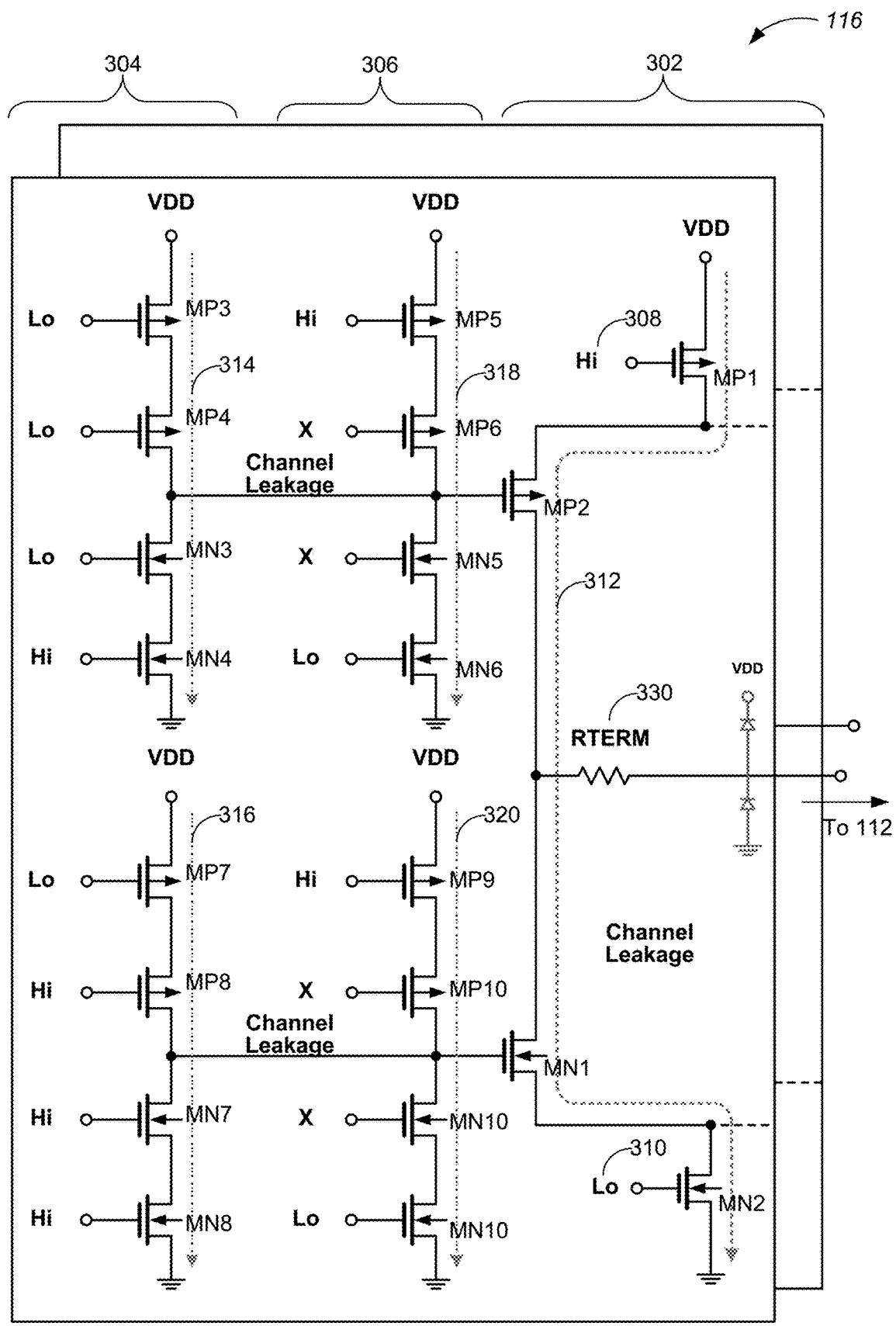
FIG. 3 is a schematic diagram of example transmitter circuit of a driver device that is configured to operate in a transmitter mode or in a receiver mode, in accordance with some embodiments.

FIG. 3 is a schematic diagram of example transmitter circuit 116 of a driver device 150 that is configured to operate in a transmitter mode or a receiver mode, in accordance with some embodiments. The driver device 150 is optionally in a connector 108 of a first electronic device 102, a second electronic device 104, or a data link 106 by which the first and second electronic device 102 and 104 are coupled to each other. The transmitter circuit 116 includes an output stage 302, a first transmitter stage 304, and a second transmitter stage 306. The output stage 302 includes a first pull-up transistor MP1, a second pull-up transistor MP2, a first pull-down transistor MN1, and a second pull-down transistor MN2. The transistors MP1, MP2, MN1, and MN2 are coupled in series between the first and second power supplies, and an I/O interface 112 is coupled to a main termination resistor 330 coupled to drains of both the second pull-up transistor MP2 and first pull-down transistor MN1.

In the output stage 302, a gate of the first pull-up transistor MP1 is controlled by a pull-up signal 308. A gate of the second pull-up transistor MP2 is controlled by a first portion of the first transmitter stage 304 and a first portion of the second transmitter stage 306. A gate of the second pull-down transistor MN2 is controlled by a pull-down signal 310. A gate of the first pull-down transistor MN1 is controlled by a second portion of the first transmitter stage 304 and a second portion of the second transmitter stage 306.

In some embodiments, each of the first and second portions of the first and second transmitter stages 304 and 306 includes two pull-up transistors in series and two pull-down transistors in series, and is configured to provide a respective output signal to control a respective gate of the pull-up transistor MP2 or pull-down transistor MN1. For example, the first portion of the first transmitter stage 304 includes pull-up transistors MP3 and MP4 and pull-down transistors MN3 and MN4. The transistors MP3, MP4, MN3, and MN4 are coupled in series between the first and second power supplies and configured to provide an output signal from a node coupled to drains of the transistors MP4 and MN3 to control the gate of the second pull-up transistor MP2.

In some situations, the driver device 150 operates in the receiver mode to receive incoming data from a load device 114 coupled to an I/O interface 112 via receiver circuit 118 (FIG. 1B), and the transmitter circuit 116 is disabled from transmitting data X via the I/O interface 112. The pull-up signal 308 and pull-down signal 310 turns off the first pull-up transistor MP1 and the second pull-down transistor MN2, respectively. The first portion of the first transmitter stage 304 is configured to reset the gate of the second pull-up transistor MP2 to the first supply voltage to turn off the second pull-up transistor MP2. The second portion of the first transmitter stage 304 is configured to reset the gate of the first pull-down transistor MN1 to the second supply voltage to turn off the first pull-down transistor MN1. As such, in the receiver mode, all transistors (e.g., MP1, MP2, MN1, and MN2) of the output stage 302 are turned off to stop transmitting the data X to the I/O interface 112, thereby opening the I/O interface 112 for receiving incoming data to be processed by the receiver circuit 118.

Conversely, in some situations (not shown in FIG. 3), the driver device 150 operates in the transmitter mode, and the transmitter circuit 116 transmits data X to the load device 114 coupled to the I/O interface 112. The pull-up signal 308 and pull-down signal 310 turns on the first pull-up transistor MP1 and the second pull-down transistor MN2, respectively. The first transmitter stage 304 is disabled from controlling the gates of the second pull-up transistor MP2 and first pull-down transistor MN1. The second transmitter stage 306 is enabled by turning on the gates of the transistors MP5, MN6, MP9, and MN10. The second transmitter stage 306 and output stage 302 form a buffer outputting the data X to the I/O interface 112.

In the transmitter mode, the termination detector 124 (FIG. 2A) is coupled to the I/O interface 112 and the transmitter circuit 116, and configured to detect whether a load device 114 is coupled to the driver device 150. In some embodiments, the termination detector 124 includes a pulse generator 202, a pulse detector 204, and a resistive unit 206. If the load device 114 is connected to provide a termination resistor 208, the resistive unit 206 of the termination detector 124 and the termination resistor 208 of the load device 114 are arranged in series to form a voltage divider driven by the pulse generator 202. The pulse generator 202 generates a drive pulse having a pulse amplitude (e.g., equal to a difference between the first and second power supplies). The pulse detector 204 is coupled to the voltage divider, and detects an output pulse having an amplitude equal to a portion (e.g., ½) of the pulse amplitude. Conversely, if the load device 114 is not connected to the I/O interface 112. The termination resistor 208 does not exist, and the I/O interface 112 is left unconnected to the termination resistor 208. The pulse generator 202 generates the drive pulse, and the pulse detector 204 coupled to the node 210 detects an output pulse having the same amplitude equal to the pulse amplitude, thereby allowing a connection signal 128 to indicate that no load device 114 is connected to the I/O interface 112.

In some embodiments, each of the output stage 302, the first and second portions of the first transmitter stages 304, and the first and second portions of the second transmitter stages 306 is coupled between the first power supply and the second power supply. The transmitter circuit 116 includes a plurality of first transistors (e.g., MP1-MP10 and MN1-MN10) having first characteristic leakage currents that are greater than a first threshold leakage current. Further, in some embodiments, the output signal of the transmitter circuit 116 corresponds to a data transmission rate that is greater than a threshold data rate, so the submicron technology is applied to manufacture the plurality of transistors of the transmitter circuit 116. These transistors have a first feature length that is less than a transistor geometric threshold. Given that the transistors are manufactured by submicron technology, corresponding leakage currents are substantially high. Even if a current path (e.g., the output stage 302) is disabled, a leakage current (e.g., a current 312 passing the output stage 302) exists to run from the first power supply to the second power supply. For example, leakage currents 312-320 flow between the first and second power supplies for current paths of the output stage 302, the first and second portions of the first transmitter stages 304, and the first and second portions of the second transmitter stages 306.

Figure 4:
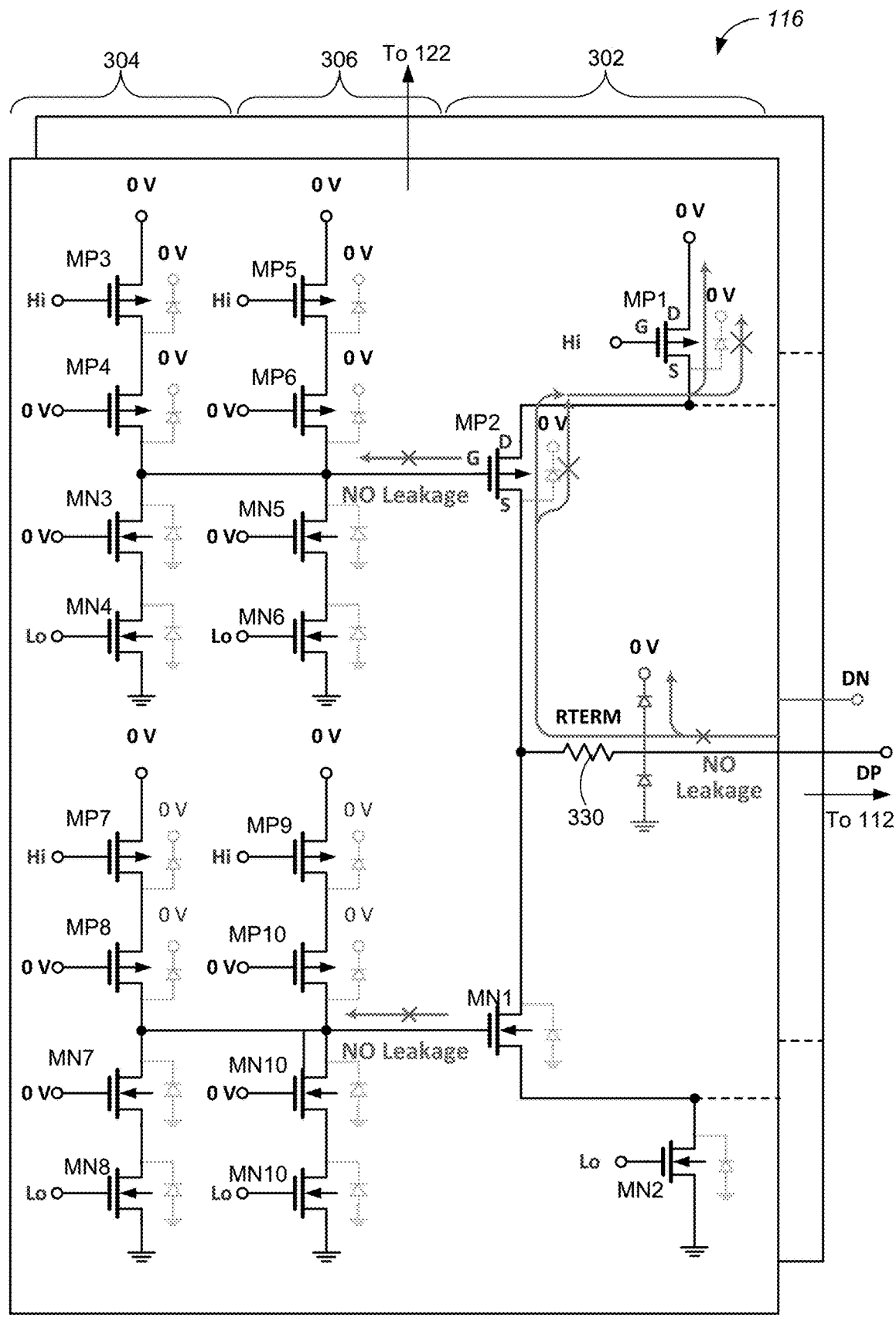
FIG. 4 is a schematic diagram of example transmitter circuit of a driver device that operates in a low power state associated with a transmitter mode, in accordance with some embodiments.

FIG. 4 is a schematic diagram of example transmitter circuit 116 of a driver device 150 that operates in a low power state associated with a transmitter mode, in accordance with some embodiments. In the low power state associated with the transmitter mode, no data is transmitted via the I/O interface 112 from the driver device 150 to a load device 114. This occurs either because no load device 114 is coupled to the I/O interface 112 of the driver device 150 or because no data is transmitted by the driver device 150. In some situations, a termination detector 124 is coupled to the I/O interface 112, detects that no load device 114 is coupled to the I/O interface 112, and generates a connection signal 128 (FIG. 1B) indicating that no load device is coupled to the I/O interface 112 in the transmitter mode. A controller 130 (FIG. 1B) receives the connection signal 128 and controls a switching unit 122 to switch off a first power interface 120 to a first power signal (e.g., a high-end power supply VDD). Alternatively, in some situations, the controller 130 determines that no internal data has been fed into the transmitter circuit 116, and controls the switching unit 122 to switch off the first power interface 120 to the first power signal.

In some embodiments, when the switch unit 122 is controlled to switch off the first power interface 120 to the first power signal, each of the output stage 302, the first and second portions of the first transmitter stage 304, and the first and second portions of the second transmitter stage 306 is decoupled from the first power supply VDD and only coupled to the second power supply. The switching unit 122 is coupled to the first power supply and the transmitter circuit 116, thereby reducing the leakage currents 312-320 (FIG. 3) in current paths of the output stage 302, the first and second portions of the first transmitter stage 304, and the first and second portions of the second transmitter stage 306.

In some embodiments, the transmitter circuit 116 includes a plurality of pull-up transistors (e.g., MP1, MP3, MP5, MP7, and MP9). Each pull-up transistor includes a respective P-type transistor and is coupled to the switching unit 122 in a respective current path (e.g., 312, 314, 316, 318, or 320) in the transmitter circuit 116. For each pull-up transistor, a respective gate of the respective pull-up transistor is coupled to the first power supply in the low power mode associated with the transmitter mode, e.g., while no data is transmitted via the I/O interface 112 in the transmitter mode. In some embodiments, the transmitter circuit 116 includes a plurality of pull-down transistors (e.g., MN2, MN4, MN6, MN8, and MN10). Each pull-down transistor includes a respective N-type transistor and is coupled to the second power supply. For each pull-down transistor, a respective gate of the respective pull-down transistor is coupled to the second power supply in the low power mode associated with the transmitter mode.

Figure 5:
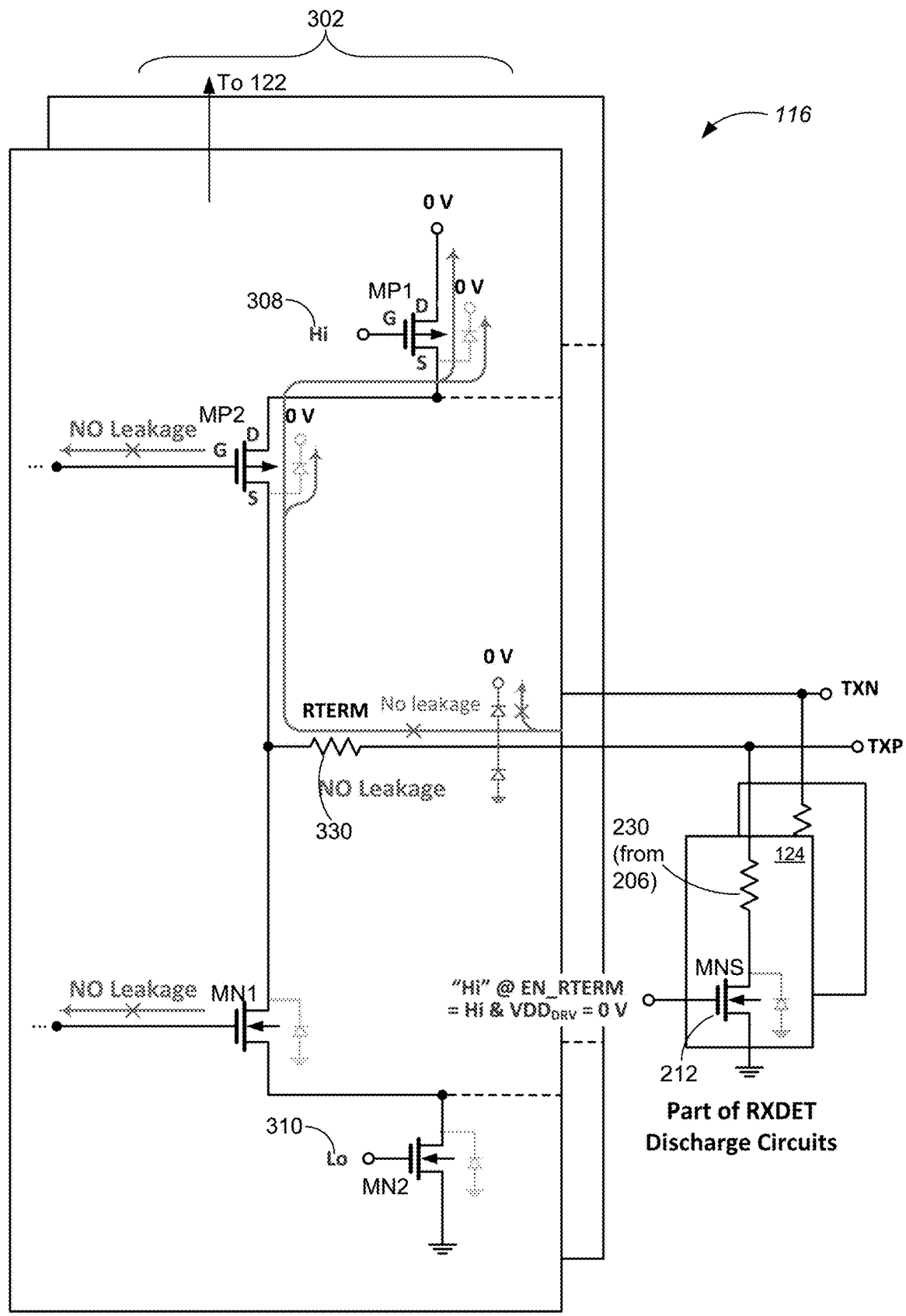
FIG. 5 is a schematic diagram of example transmitter circuit of a driver device that operates in a low power state associated with a receiver mode, in accordance with some embodiments.

FIG. 5 is a schematic diagram of example transmitter circuit 116 of a driver device 150 that operates in a low power state associated with a receiver mode, in accordance with some embodiments. In the receiver mode, the transmitter circuit 116 is disabled from transmitting any data to a load device 114 coupled to an I/O interface 112 of the transmitter circuit 116. The first and second transmitter stages 304 and 306 are biased as shown in FIG. 4. The second transmitter stage 306 is disabled. The first transmitter stage 304 operates to provide gate voltages of the second pull-down transistor MP2 and the first pull-up transistor MN1 to turn off the second pull-down transistor MP2 and first pull-up transistor MN1. The pull-up signal 308 and pull-down signal 310 turns off the first pull-up transistor MP1 and the second pull-down transistor MN2, respectively. As such, the output stage 302 is turned off and cannot output any data to interference data receiving at the I/O interface 112.

In the low power state associated with the receiver mode, a switching unit 122 switches off the first power interface 120 to the first power supply VDD for the first transmitter stage 304, second transmitter stage 306, and output stage 302 of the transmitter circuit 116. This switching unit 122 reduces or suppresses a leakage current between the I/O interface 112 and the first power interface 120.

A termination detector 124 is coupled to the I/O interface and a third power interface 126 (FIG. 1B). The third power interface 125 provides the first power supply to the termination detector 124. In the receiver mode, the termination detector 124 does not need to detect the load device 114, e.g., because a termination detector 124 of the load device 114 is in charge of load detection. In some embodiments, the third power interface 126 is switched off to further reduce power consumption by the driver device 150. Additionally, the output stage 302 is turned off and coupled to the first and second power supplies via two high impedance paths to which the termination resistor 330 is coupled. An auxiliary termination resistor 230 (FIG. 2B) is provided by the termination detector 124 and detected by the termination detector 124 of the load device 114. Specifically, in some embodiments, a resistive unit 206 of the termination detector 124 is coupled to the I/O interface 112 and a second power supply to provide the auxiliary termination resistor 230 in the receiver mode. In an example, a switch 212 includes a transistor (e.g., an NMOS transistor) for controlling coupling of the resistive unit to the second power supply. More details on the termination detector 124 are explained above with reference to FIGS. 2A-2C.

Figure 6A:
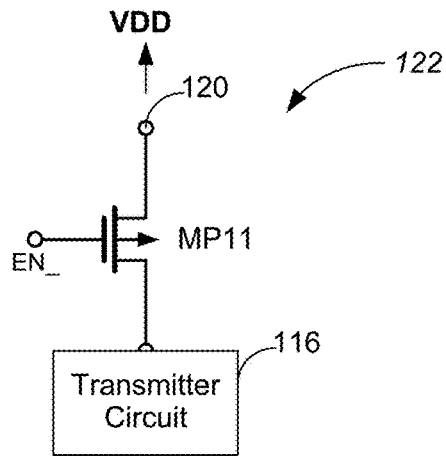
FIG. 6A is a schematic diagram of an example switching unit including a P-type transistor, in accordance with some embodiments.
Figure 6B:
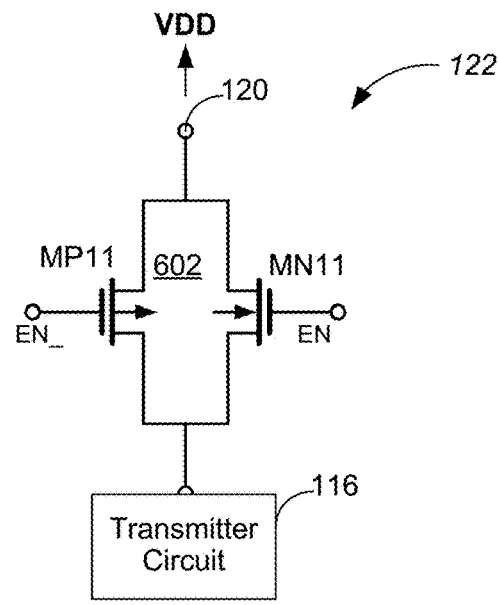
FIG. 6B is a schematic diagram of another example switching unit including a transmission gate, in accordance with some embodiments.

FIG. 6A is a schematic diagram of an example switching unit 122 including a P-type transistor MP11, in accordance with some embodiments, and FIG. 6B is a schematic diagram of another example switching unit 122 including a transmission gate 602, in accordance with some embodiments. Transmitter circuit 116 includes a plurality of first transistors, and the switching unit 122 includes one or more second transistors MP11 that are different type transistors from the first transistors. The first transistors have first characteristic leakage currents that are greater than a first threshold leakage current, and the second transistors MP11 have second characteristic leakage currents that are less than a second threshold leakage current that is equal to or less than the first threshold leakage current. Stated another way, the first characteristic leakage currents of the first transistors of the transmitter circuit 116 are greater than the second characteristic leakage currents of the second transistors MP11 of the switching unit 122. In some embodiments, the first transistors of the transmitter circuit 116 are manufactured by submicron technology, while the second transistors MP11 of the switching unit 122 have longer channel lengths and can be shut down with insignificant leakage currents.

Referring to FIG. 6A, in some embodiments, each second transistor MP11 of the switching unit 122 includes the P-type transistor MP11, and is coupled between the first power supply and a respective current path (e.g., 312, 314, 316, 318, and 320 in FIG. 3) of the transmitter circuit 116. Each second transistor MP11 is configured to control coupling of the respective current path to the first power supply of the first power interface 120. Each current path can be individually controlled. Alternatively, in some embodiments, each second transistor MP11 of the switching unit 122 is coupled between the first power supply and two or more current paths of the transmitter circuit 116 to control switching of the two or more current paths jointly. In an example, the switching unit 122 includes a single P-type transistor MP11 configured to control all current paths of the transmitter circuit 116 of the driver device 150.

Referring to FIG. 6B, in some embodiments, each second transistor MP11 of the switching unit 122 is further coupled in parallel to a respective third transistor MN11. The respective third transistor MN11 includes an N-type transistor, which is also manufactured differently from the first transistors of the transmitter circuit 116 and has an insignificant leakage current (e.g., less than the second threshold leakage current). The respective third transistor MN11 has a third characteristic leakage current less than a threshold leakage current (e.g., that is smaller than the first threshold leakage current). Each second transistor MP11 and the respective third transistor MN11 forms a first transmission gate 602 configured to control coupling of one or more respective current paths to the first power supply VDD jointly.

Figure 6D:
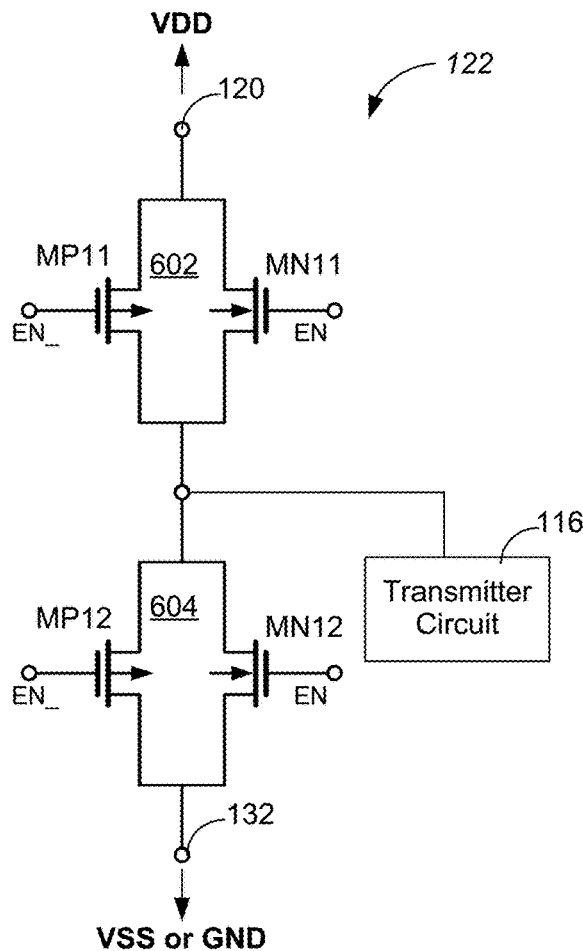
FIG. 6D is a schematic diagram of another example switching unit including a first transmission gate and a second transmission gate, in accordance with some embodiments.
Figure 6C:
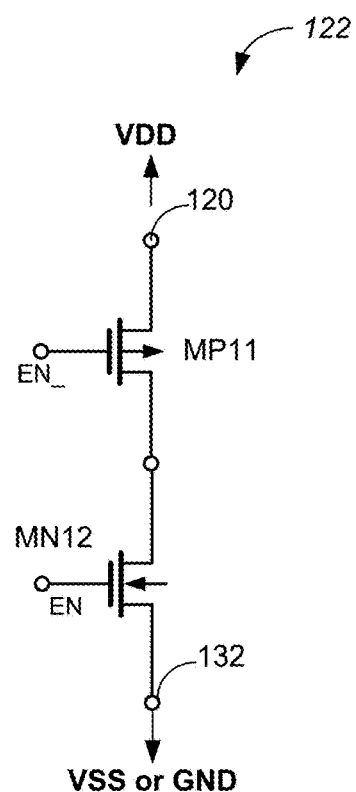
FIG. 6C is a schematic diagram of an example switching unit including a P-type transistor and an N-type transistor, in accordance with some embodiments.

FIG. 6C is a schematic diagram of an example switching unit 122 including a P-type transistor MP11 and an N-type transistor MN12, in accordance with some embodiments, and FIG. 6D is a schematic diagram of another example switching unit 122 including a first transmission gate 602 and a second transmission gate 604, in accordance with some embodiments. The transmitter circuit 116 is further coupled to a second power interface 132 to the second power supply. Referring to FIG. 6C, in the low power state, the switch unit 122 is controlled to switch on the N-type transistor MN12 associated with the second power interface 132 to the second power supply in addition to switching off the P-type transistor MP11 associated with the first power interface 120 to the first power signal. Referring to FIG. 6D, in the low power state, the switch unit 122 is controlled to switch on the second transmission gate 604 associated with the second power interface 132 to the second power supply in addition to switching off the first transmission gate 602 associated with the first power interface 120 to the first power signal. By these means, a high supply node of each of the output stage 302, the first and second portions of the first transmitter stage 304, and the first and second portions of the second transmitter stage 306 is forced to a voltage level (e.g., 0V) of the second power supply.

Figure 7:
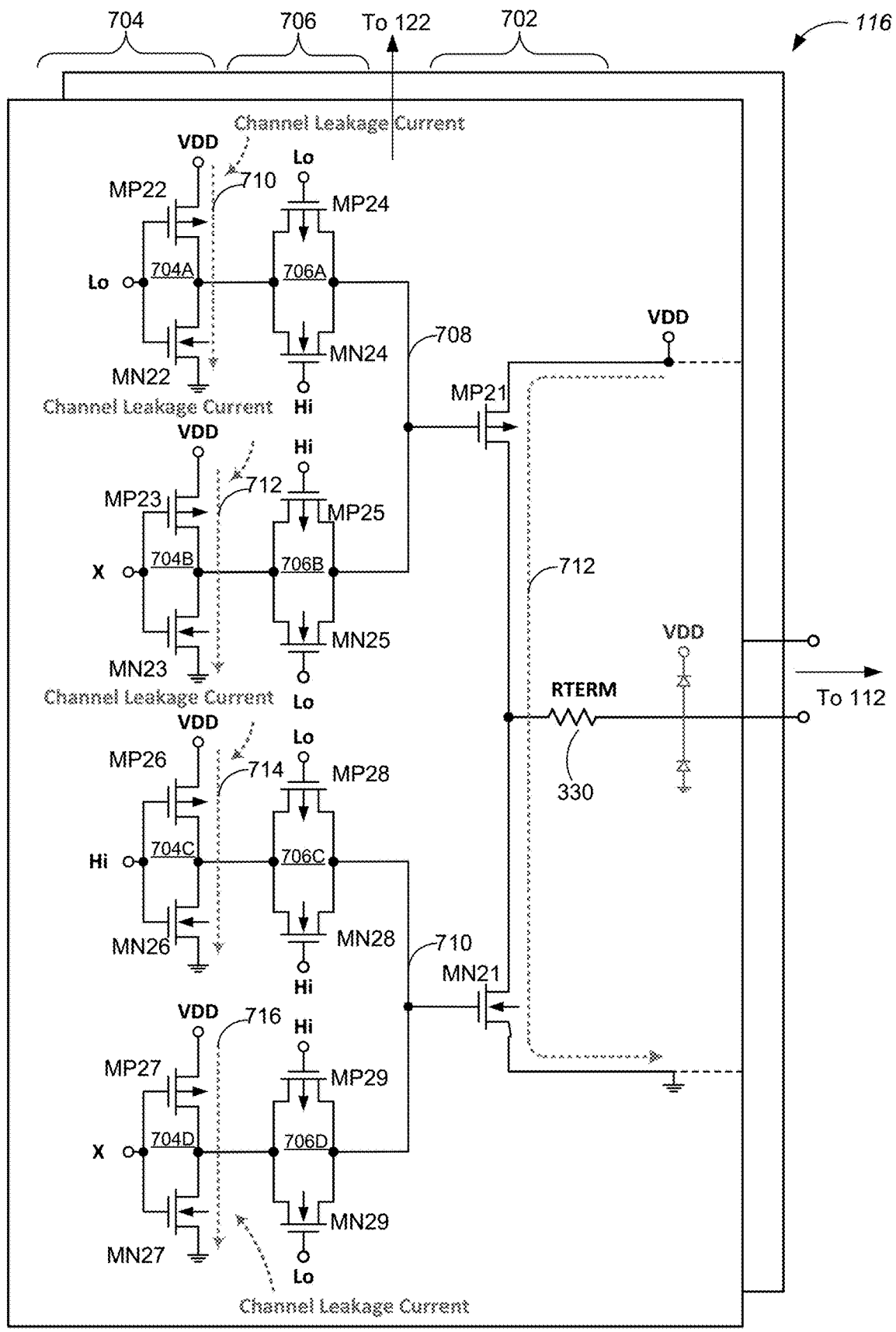
FIG. 7 is a schematic diagram of an example transmitter circuit of a driver device that operates in a transmitter mode or in a receiver mode, in accordance with some embodiments.

FIG. 7 is a schematic diagram of example transmitter circuit 116 of a driver device 150 that operates in a transmitter mode or a receiver mode, in accordance with some embodiments. The driver device 150 is optionally in a connector of a first electronic device 102, a second electronic device 104, or a data link 106 by which the first and second electronic device 102 and 104 are coupled to each other. The transmitter circuit 116 includes an output stage 702, a first transmitter stage 704, and a second transmitter stage 706. The output stage 702 includes a pull-up transistor MP21 and a pull-down transistor MN21. The transistors MP21 and MN21 are coupled in series between the first and second power supplies, and an I/O interface 112 is coupled to a main termination resistor 330, which is further coupled to drains of both the pull-up transistor MP21 and pull-down transistor MN21. In the output stage 702, a gate of the pull-up transistor MP21 is controlled by a pull-up signal 708, and a gate of the pull-down transistor MN21 is controlled by a pull-down signal 310. The first transmitter stage 704 includes four inverters 704A, 704B, 704C, and 704D, and these four inverters 704A-704D are biased between the first and second power supplies. The second transmitter stage 706 includes four transmission gates 706A, 706B, 706C, and 706D. The transmission gates 706A and 706C couple outputs of the inverters 704A and 704C to the pull-up signal 708 for controlling the gate of the pull-up transistor MP21, respectively. The transmission gates 706C and 706D couple outputs of the inverters 704C and 704D to the pull-down signal 710 for controlling the gate of the pull-down transistor MN21, respectively.

In some situations, the driver device 150 operates in the receiver mode to receive incoming data from a load device 114 coupled to an I/O interface 112 via receiver circuit 118 (FIG. 1B), and the transmitter circuit 116 is disabled from transmitting data X via the I/O interface 112. The gates of the pull-up transistor MP21 and pull-down transistor MN21 are controlled to turn off both current paths to the first and second power supplies. The transmission gates 706A and 706C are turned on, allowing outputs of the inverters 704A and 704C to pass and switch off both transistors MP21 and MN21. Particularly, inputs the inverters 704A and 704C are low and high, and inverted to high and low to switch off the transistors MP21 and MN21, respectively. The transmission gates 706B and 706D are controlled in a complementary manner, i.e., switched off, such that data X is not passed to the gates of the pull-up transistor MP21 and pull-down transistor MN21. By these means, the output stage 702 provides high impedance paths to the first and second power supplies to the I/O interface 112, and the I/O interface 112 is disabled from transmitting data X and enabled to facilitate receiving data by the receiver circuit 118.

In some situations (not shown in FIG. 7), the driver device 150 operates in the transmitter mode, and the transmitter circuit 116 transmits data X to the load device 114 coupled to the I/O interface 112. The transmission gates 706A and 706C are turned off, and the transmission gates 706B and 706D are turned on to allow outputs of the inverters 704B and 704D to pass and control both transistors MP21 and MN21. Both inputs of the inverters 704B and 704D are data X. The first stage 704 and the output stage 702 form a buffer with an input of the data X, and an output signal at the I/O interface 112 are consistent with the data X.

In the transmitter mode, the termination detector 124 (FIG. 2A) is coupled to the I/O interface 112 and the transmitter circuit 116, and configured to detect whether a load device 114 is coupled to the driver device 150. In some embodiments, the termination detector 124 includes a pulse generator 202, a pulse detector 204, and a resistive unit 206. If the load device 114 is connected to provide a termination resistor 208, the resistive unit 206 of the termination detector 124 and the termination resistor 208 of the load device 114 are arranged in series to form a voltage divider driven by the pulse generator 202. The pulse generator 202 generates a drive pulse having a pulse amplitude (e.g., equal to a difference between the first and second power supplies). The pulse detector 204 is coupled to the voltage divider, and detects an output pulse having an amplitude equal to a portion (e.g., ½) of the pulse amplitude. Conversely, if the load device 114 is not connected to the I/O interface 112. The termination resistor 208 does not exist, and the I/O interface 112 is left unconnected to the termination resistor 208. The pulse generator 202 generates the drive pulse, and the pulse detector 204 coupled to the node 210 detects an output pulse having the same amplitude equal to the pulse amplitude, thereby allowing a connection signal 128 to indicate that no load device 114 is connected to the I/O interface 112.

In some embodiments, each of the output stage 702, the inverters 704A-704D of the first transmitter stage 704, and the transmission gates 706A-706D of the second transmitter stages 706 is coupled between the first power supply VDD and the second power supply. The transmitter circuit 116 includes a plurality of first transistors (e.g., MP21-MP29 and MN21-MN29) having first characteristic leakage currents that are greater than a first threshold leakage current. Further, in some embodiments, the output signal of the transmitter circuit 116 corresponds to a data transmission rate that is greater than a threshold data rate, so the submicron technology is applied to manufacture the plurality of transistors of the transmitter circuit 116. These transistors have a first feature length that is less than a transistor geometric threshold. Given that the first transistors are manufactured by submicron technology, corresponding leakage currents are substantially high. Even if a current path is disabled (e.g., the output stage 702 is disabled), a leakage current 712 exists to run from the first power supply to the second power supply. For example, leakage currents 708-716 flow between the first and second power supplies for current paths of the output stage 702 and the inverters 704A-704D of the first transmitter stages 704.

Figure 8:
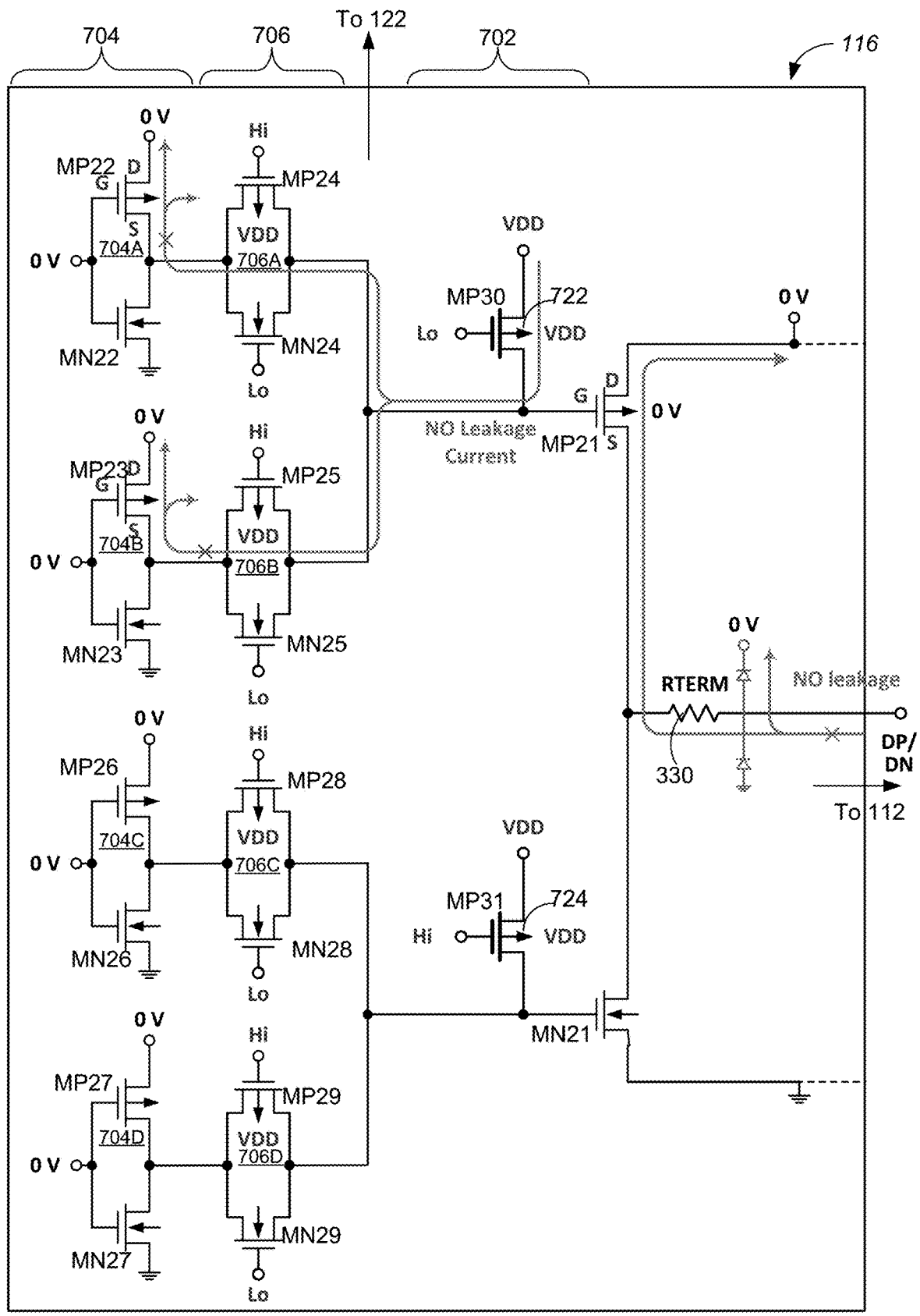
FIG. 8 is a schematic diagram of transmitter circuit of another example driver device that operates in a low power state associated with a transmitter mode, in accordance with some embodiments.

FIG. 8 is a schematic diagram of transmitter circuit 116 of another example driver device 150 that operates in a low power state associated with a transmitter mode, in accordance with some embodiments. In the low power state associated with the transmitter mode, no data is transmitted via the I/O interface 112 from the driver device 150 to a load device 114, e.g., because no load device 114 is coupled to the I/O interface 112 of the driver device 150. In some situations, a termination detector 124 (FIGS. 1B and 2A) is coupled to the I/O interface 112 and detects that no load device 114 is coupled to the I/O interface 112 and generate a connection signal 128 indicating that no load device 114 is coupled to the I/O interface 112 in the transmitter mode. A controller 130 receives the connection signal 128 and controls a switching unit 122 to switch off a first power interface 120 to a first power signal.

In some embodiments, when the switch unit 122 is controlled to switch off the first power interface 120 to the first power signal, each of the output stage 702 and the inverters of the first transmitter stage 704 is decoupled from the first power supply VDD, forming a high impedance path to the first power supply VDD. The switching unit 122 is coupled between the first power supply and the transmitter circuit 116, thereby reducing the leakage currents 708-716 (FIG. 7) in current paths of the output stage 702 and the inverters of the first transmitter stage 704. In some embodiments, each of the output stage 702 and the inverters of the first transmitter stage 704 is further coupled to the second power supply. The switching unit 122 is coupled between the second power supply and the transmitter circuit 116, which also reduces the leakage currents 708-716 (FIG. 7) in current paths of the output stage 702 and the inverters of the first transmitter stage 704.

The controller 130 turns off the transmission gates 706A-706D in accordance with a determination that no load device is coupled the I/O interface 112 in the transmitter mode. Specifically, a high voltage (e.g., VDD) and a low voltage (e.g., GND) are applied at a gate of a P-type transistor and a gate of an N-type transistor of each transmission gate of the second transmitter stage 706, respectively. Additionally, a first transistor 722 (e.g., a P-type transistor MP30) is coupled between the first supply voltage and a gate of the pull-up transistor MP21 of the output stage 702 of the transmitter circuit 116. The first transistor 722 is switched on to pull the gate of the pull-up transistor MP21 high, thereby switching off the pull-up transistor MP21 of the output stage 702 of the transmitter circuit 116. A second transistor 724 (e.g., a P-type transistor MP31) is coupled between the first supply voltage and a gate of the pull-down transistor MN21 of the output stage 702 of the transmitter circuit 116. The second transistor 724 is switched off. It is noted that leakage currents flowing through the transmission gates 706A and 706B and first transistor 722 are also reduced by the switching unit 122 coupled to the first transmitter stage 704 as well.

Figure 9:
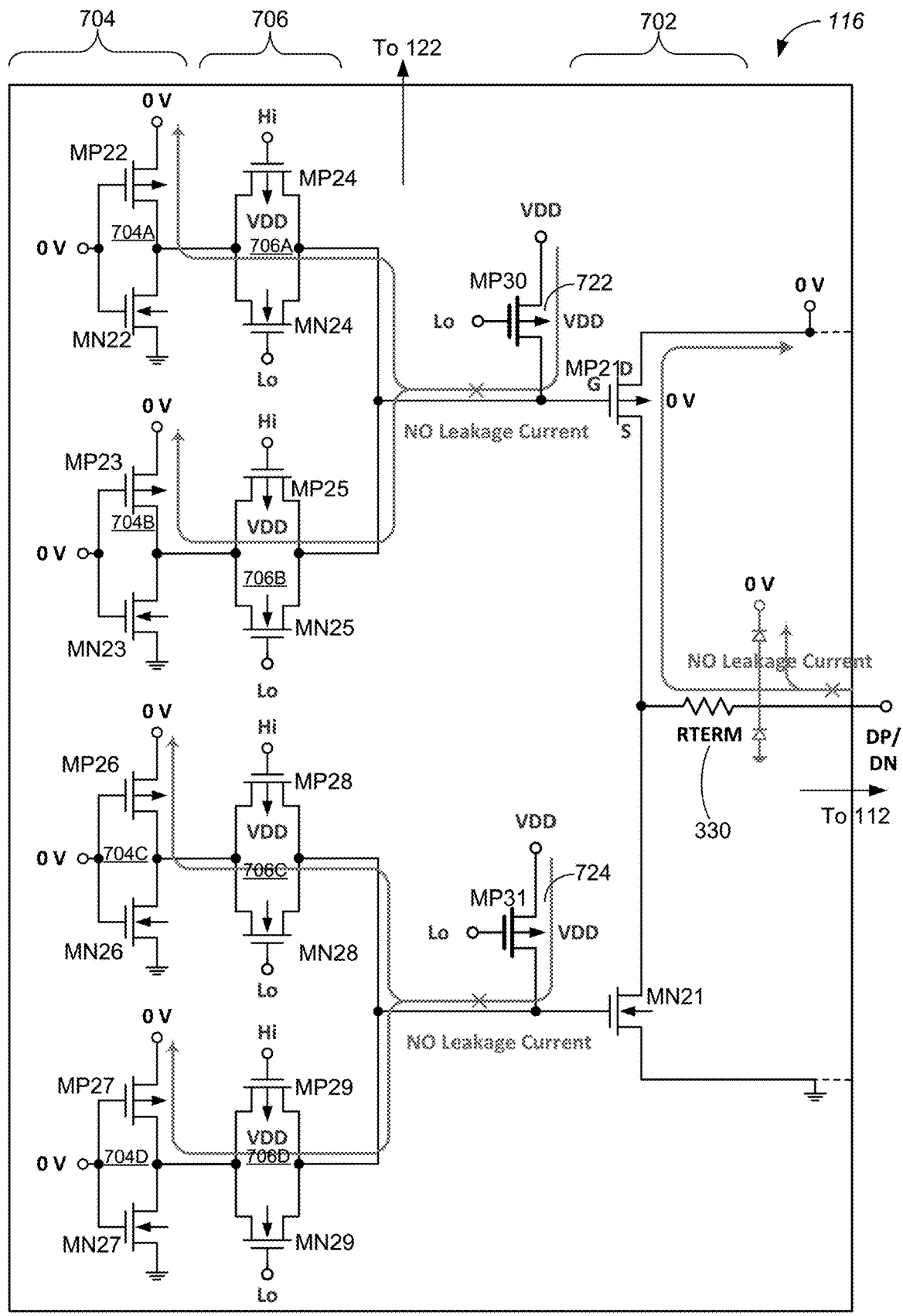
FIG. 9 is a schematic diagram of a transmitter circuit of another example driver device that has a low power state associated with a receiver mode, in accordance with some embodiments.

FIG. 9 is a schematic diagram of transmitter circuit 116 of another example driver device 150 that has a low power state associated with a receiver mode, in accordance with some embodiments. In the receiver mode, the transmitter circuit 116 is disabled from transmitting any data to a load device 114 coupled to an I/O interface 112 of the transmitter circuit 116. The second transmitter stage 706 is disabled, and thereby, decouples the first transmitter stage 304 from the output stage 702. Gates of the pull-up transistor MP21 and pull-down transistor MN21 are not controlled by the first transmitter stage 304. Additionally, a first transistor 722 (e.g., a P-type transistor MP30) is coupled between the first supply voltage and a gate of the pull-up transistor MP21 of the output stage 702 of the transmitter circuit 116. A second transistor 724 (e.g., a P-type transistor MP31) is coupled between the first supply voltage and a gate of the pull-down transistor MN21 of the output stage 702 of the transmitter circuit 116. Both of the first transistor 722 and second transistor 724 are switched on to pull the gates of the pull-up transistor MP21 and pull-down transistor MN21 high. The pull-down transistor MN21 is switched on to keep a current path connecting the I/O interface 112 and the second power supply and passing a main termination resistor 330 in the receiver mode.

In the low power state associated with the receiver mode, a switching unit 122 switches off the first power interface 120 to the first power supply VDD for the first transmitter stage 304 and output stage 302 of the transmitter circuit 116. This switching unit 122 reduces or suppresses a leakage current between the I/O interface 112 and the first power interface 120.

A termination detector 124 is coupled to the I/O interface 112 and a third power interface 126 (FIG. 1B). The third power interface 125 provides the first power supply to the termination detector 124. In the receiver mode, the termination detector 124 does not need to detect the load device 114, e.g., because a termination detector 124 of the load device 114 is in charge of load detection. In some embodiments, the termination detector 124 switches off the third power interface 125 to further reduce power consumption by the driver device 150. A termination resistance detected by the termination detector 124 of the load device 114 is provided by the main termination resistor 330, because the pull-down transistor MN21 is switched on to pull the I/O interface 112 to the second power supply via the main termination resistor 330 in the receiver mode. In contrast, referring to FIG. 5, in some embodiments, a resistive unit 206 of the termination detector 124 is coupled to the I/O interface 112 and a second power supply to provide an auxiliary termination resistor 206 in the receiver mode. In an example, a switch 212 includes a transistor (e.g., an NMOS transistor) for controlling coupling of the resistive unit 206 to the second power supply. More details on the termination detector 124 are explained above with reference to FIGS. 2A-2C.

As explained above, the switching unit 122 optionally includes a P-type transistor MP11 (FIG. 6A), a transmission gate 602 (FIG. 6B), a P-type transistor MP11 and an N-type transistor MN12 (FIG. 6C), or a first transmission gate 602 and a second transmission gate 604 (FIG. 6D). In some embodiments, each current path of the transmitter circuit 116 is switched off independently by the switching unit 122. Alternatively, in some embodiments, all current paths of the transmitter circuit 116 are switched off jointly by the switching unit 122. Additionally and alternatively, in some embodiments, a subset (less than all) of the current paths of the transmitter circuit 116 is switched off jointly by the switching unit 122.

Transmitter circuit 116 (FIG. 7-9) includes a plurality of first transistors, and the switching unit 122 includes one or more second transistors (e.g., MP11, MP12, MN11, and MN12) that are different types from the first transistors. The first transistors of the transmitter circuit 116 have first characteristic leakage currents that are greater than a first threshold leakage current, and the second transistors of the switching unit 122 have second characteristic leakage currents that are less than a second threshold leakage current that is equal to or less than the first threshold leakage current. Stated another way, the first characteristic leakage currents of the first transistors are greater than the second characteristic leakage currents of the second transistors. In some embodiments, the first transistors of the transmitter circuit 116 are manufactured by submicron technology, while the second transistors of the switching unit 122 are not. The second transistors of the switching unit 122 have longer channel lengths and can be shut down with insignificant leakage currents.

Figure 10:
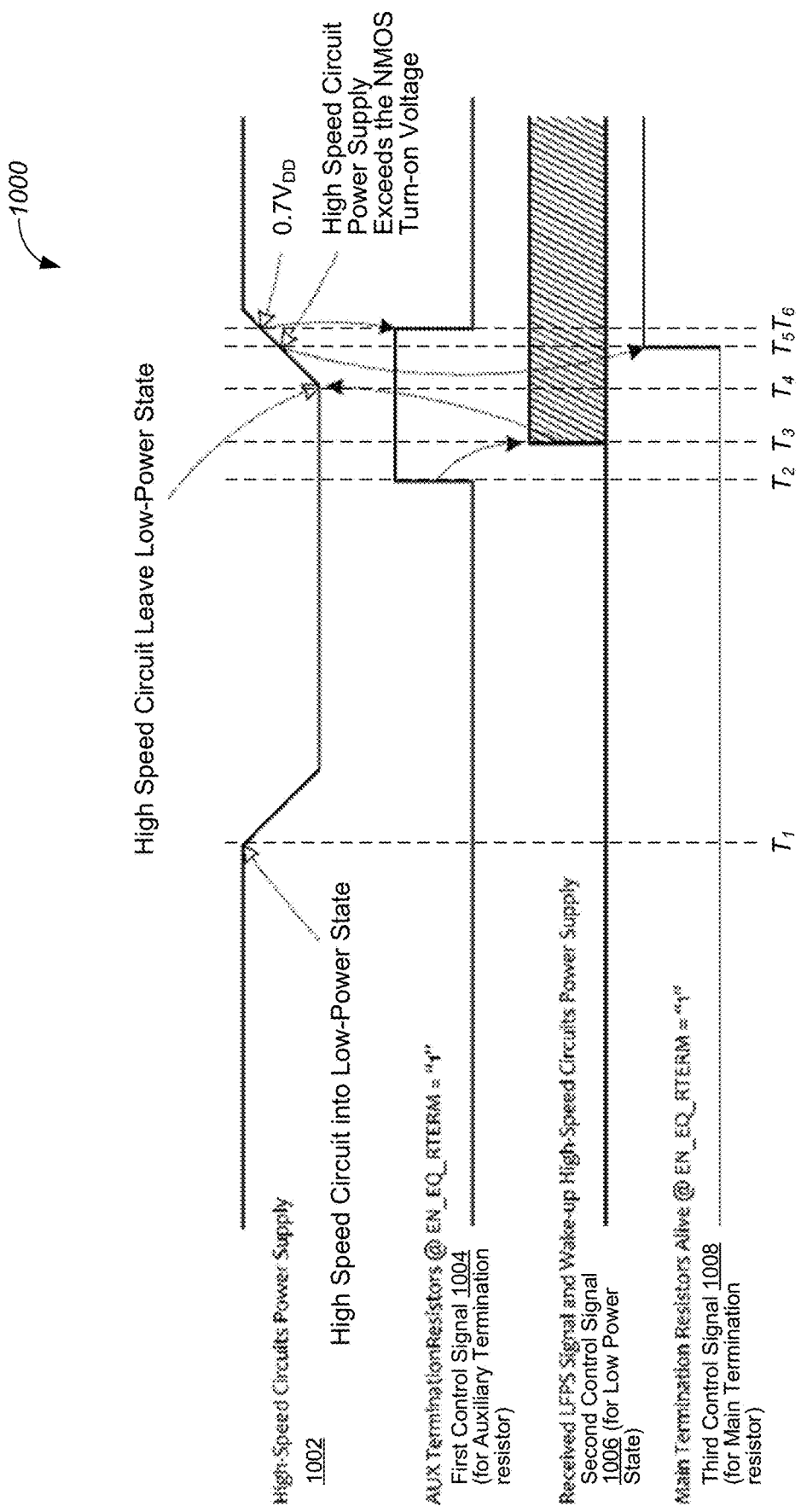
FIG. 10 is a temporal diagram of four example control signals configured to enable a termination resistor for a driver device that operates in a receiver mode, in accordance with some embodiments.

FIG. 10 is a temporal diagram 1000 of four example control signals configured to enable a termination resistor for a driver device 150 that operates in a receiver mode, in accordance with some embodiments. When the driver device 150 operates in the receiver mode, receiver circuit 118 of the driver device 150 receives data from a load device 114 coupled to an I/O interface 112 of the driver device 150. A termination detector 124 of the load device 114 periodically issues pulsed signals to detect the driver device 150 operating in the receiver mode, and a termination detector 124 of the driver device 150 does not need to detect the load device 114. When a main termination resistor 330 is not disabled, the termination detector 124 provides an auxiliary termination resistor 230 (FIG. 2B), such that the driver device 150 is detectable by the load device 114. As such, the termination detector 124 is disabled in the receiver mode and operates in a low power mode, while optionally providing an auxiliary termination resistor 230 for load detection.

Referring to FIG. 10, in an example, the driver device 150 (FIGS. 3-5) operates in a low power state associated with the receiver mode starting from a first time $T_1$. A power level 1002 at the first power interface of the driver device 150 drops from a first power supply to a second power supply (e.g., from VDD to GND) at the first time $T_1$. At a second time $T_2$ subsequent to the first time $T_1$, a first control signal 1004 is enabled and controls a switch 212 (FIG. 2B) to electrically couple the resistive unit 206 of the termination detector 124 to the second power supply, thereby providing an auxiliary termination resistor 230 for the receiver mode. The auxiliary termination resistor 230 is provided by the termination detector 124, e.g., re-configured from the resistive unit 206 of the termination detector 124. At a third time $T_3$ subsequent to the second time $T_2$, a second control signal 1006 is enabled to terminate the lower power state and the receiver mode. In response to the second control signal 1006 being enabled, the power level 1002 at the first power interface 120 of the driver device 150 starts to ramp up at a fourth time $T_4$ subsequent to the third time $T_3$. The power level 1002 at the first power interface of the driver device 150 increases to a first predefined voltage level (e.g., ½VDD) at a fifth time $T_5$. In accordance with a determination that the power level 1002 reaches the first predefined voltage level, a third control signal 1008 is enabled to connect a main termination resistor 330 (RTERM) of the driver device 150 (FIGS. 3-5) at the fifth time $T_5$. The power level 1002 at the first power interface of the driver device 150 continues to increase to a second predefined voltage level (e.g., 0.7 VDD), which is greater than the first predefined voltage level, at a sixth time $T_6$. In accordance with a determination that the power level 1002 reaches the second predefined voltage level, the auxiliary termination resistor 230 is disabled at the sixth time $T_6$. Stated another way, in some embodiments, the auxiliary termination resistor 230 is enabled in the low power state associated with the receiver mode, and controlled by power detection circuit automatically or a digital interface manually once the first power interface to the first power supply is switched on for the transmitter circuit 116.

FIG. 11 is a flow diagram of a method 1100 for controlling power consumption of a driver device 150, in accordance with some embodiments. The method 1100 is implemented in a driver device including the driver device 150, and the driver device 150 includes at least transmitter circuit 116. The driver device determines (1102) that operation of transmitter circuit 116 satisfies one or more low power state criteria. The transmitter circuit 116 is coupled (1104) to an I/O interface 112 and a first power interface 120. The I/O interface 112 is configured to couple to a load device 114, and the first power interface 120 provides a first power supply for transmitting data via the I/O interface 112. The transmitter circuit 116 is powered (1106) by the first power supply and provide an output signal to the load device 114 via the I/O interface 112 in a transmitter mode. In accordance with a determination that operation of the transmitter circuit 116 satisfies one or more low power state criteria, the driver device switches off (1108) the first power interface 120 for the transmitter circuit 116. The transmitter circuit 116 has (1110) a power consumption level below a threshold power level in a low power state associated with the one or more low power state criteria.

In some embodiments, the one or more low power state criteria require (1112) that no data is transmitted via the I/O interface 112 when the transmitter circuit 116 is operating in the transmitter mode. In some embodiments, the one or more low power state criteria require that the driver device operates in a receiver mode.

In some embodiments, the transmitter circuit 116 includes (1114) a plurality of first transistors having first characteristic leakage currents that are greater than a first threshold leakage current. In some embodiments, the output signal of the transmitter circuit 116 corresponds to a data transmission rate that is greater than a threshold data rate. The plurality of first transistors operate in a submicron region and has a high leakage current greater than a threshold leakage current. The plurality of first transistors are fast, and however, leaky. In some embodiments, each first transistor has a first transistor length that is less than a transistor geometric threshold. Further, in some embodiments, the first power interface 120 is powered off by a switching unit 122, and the switching unit 122 includes (1116) one or more second transistors having second characteristic leakage currents that are less than a second threshold leakage current that is equal to or less than the first threshold leakage current.

In some embodiments, a second power interface 132 provides a second power supply for transmitting the data via the I/O interface 112. The transmitter circuit 116 is powered by both the first and second power supplies. A switching unit 122 is also coupled to the first, power interface, the second power interface 132, and the transmitter circuit 116. In the low power state, the switching unit 122 switches off the first power interface 120 and switches on the second power interface 132 for the transmitter circuit 116 that operates in the low power state. For example, the first and second power supplies correspond to a high-end power supply VDD (e.g., 1.5V) and a low-end power supply VSS (e.g., −1.5V). The switching unit 122 electrically decouples the transmitter circuit 116 from the high-end power supply VDD and couples the transmitter circuit 116 to the low-end power supply VSS in the low power state. In another example, the first and second power supplies correspond to a high-end power supply VDD (e.g., 1.5V) and a ground supply GND (e.g., 0V). The switching unit 122 electrically decouples the transmitter circuit 116 from the high-end power supply VDD and couples the transmitter circuit 116 to the ground supply GND in the low power state.

In some embodiments, the transmitter circuit 116 includes a plurality of first transistors (e.g., MP1-MP10 and MN1-MN10 in FIG. 3), and a switching unit 122 is used to switch off the first power interface 120 and includes one or more second transistors (e.g., MP11 in FIGS. 6A-6D). Each second transistor of the switching unit 122 includes a P-type transistor, and is coupled between the first power supply and a respective current path of the transmitter circuit 116. Each second transistor controls coupling of the respective current path to the first power supply of the first power interface 120. In some embodiments, the first transistors have a first transistor length, and the second transistor have a second transistor length greater than the first transistor length. Further, in some embodiments, each second transistor of the switching unit 122 is further coupled in parallel to a respective third transistor (e.g., MN11 in FIGS. 6B and 6D), and the respective third transistor including an N-type transistor. The P-type transistor and N-type transistor form a transmission gate 602 (FIGS. 6B and 6D). The respective third transistor has a third characteristic leakage current less than a threshold leakage current. Each second transistor and the respective third transistor control coupling of the respective current path to the first power supply jointly.

In some embodiments, a termination detector 124 is coupled to the I/O interface 112. The termination detector 124 detects whether the load device 114 is coupled to the I/O interface 112 and generates a connection signal 128 (FIG. 1B) indicating whether the load device 114 is coupled to the I/O interface 112 in the transmitter mode. Further, in some embodiments, a controller 130 is coupled to the switching unit 122, transmitter circuit 116, and termination detector 124. The controller 130 controls switching off of the first power interface 120 based on the connection signal 128 in the transmitter mode. Additionally, in some embodiments, in the transmitter mode, the controller 130 receives the connection signal 128 and determines whether the load device 114 is coupled to the I/O interface 112 based on the connection signal 128. In accordance with a determination that the load device 114 is coupled to the I/O interface 112, the controller 130 disables (e.g., leaves) the low power state in the transmitter circuit 116. In accordance with a determination that the load device 114 is not coupled to the I/O interface 112, the controller 130 enables (e.g., keeps) the low power state in the transmitter circuit 116.

In some embodiments, receiver circuit 118 is coupled to (1118) the I/O interface 112. The receiver circuit 118 receives the input signal from the load device 114 in a receiver mode. Further, in some embodiments, the transmitter circuit 116 operates in the low power state and in the receiver mode. A switching unit 122 switches off the first power interface 120 for the transmitter circuit 116 in the receiver mode. Additionally, in some embodiments, a termination detector 124 is coupled to (1120) the I/O interface 112 and a third power interface 126, and the third power interface 126 is distinct from the first power interface 120 and provides the first power supply to the termination detector 124. The termination detector 124 switches off the third power interface 126 and provide an auxiliary termination resistor 230 (FIG. 2B) between the I/O interface 112 and a second power supply in the receiver mode. The auxiliary termination resistor 230 has resistance substantially equal to 50 ohm.

In some embodiments, the transmitter circuit 116 includes a plurality of pull-up transistors (e.g., MP1, MP3, MP5, MP7, and MP9 in FIGS. 3-6, MP21 and MP22 in FIGS. 7-9). Each pull-up transistor includes a respective P-type transistor and is coupled to the switching unit 122 in a respective current path in the transmitter circuit 116. For each pull-up transistor, a respective gate of the respective pull-up transistor is coupled to the first power supply while no data is transmitted via the I/O interface 112 in the transmitter mode. Further, in some embodiments, the plurality of pull-up transistors includes a first pull-up transistor (e.g., MP21 in FIGS. 8 and 9) coupled in a current path of the transmitter circuit 116. A second pull-up transistor (e.g., MP30 in FIGS. 8 and 9) is coupled to a gate of the first pull-up transistor and the first power supply, and couples the gate of the first pull-up transistor to the first power supply in the low power state.

In some embodiments, the transmitter circuit 116 includes a plurality of pull-down transistors (e.g., MN2, MN4, MN6, MN8, and MN10 in FIGS. 3-6, MN21, MN22, MN23, MN26, and MN27 in FIGS. 7-9). Each pull-down transistor includes a respective N-type transistor and is coupled to a second power supply in a respective current path in the transmitter circuit 116. For each pull-down transistor, a respective gate of the respective pull-down transistor is coupled to the second power supply in the low power state.

In some embodiments, a termination detector 124 is coupled to the I/O interface 112 and a third power interface 126. The third power interface 126 is distinct from the first power interface 120 and provides the first power supply to the termination detector 124. The third power interface 126 is switched off in a receiver mode. The termination detector 124 includes a resistive unit 206 and an N-type transistor. When the switch 212 (i.e., N-type transistor MNS in FIG. 5) is enabled, the resistive unit 206 is configured to provide an auxiliary termination resistor 230 between the I/O interface 112 and a second power supply in the receiver mode.

In some embodiments, the method 1100 is, optionally, governed by instructions that are stored in a non-transitory computer readable storage medium and that are executed by one or more processors (e.g., a controller) of an electronic device (e.g., a driver device). Each of the operations shown in FIG. 11 may correspond to instructions stored in a memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

It should be understood that the particular order in which the operations in FIG. 11 have been described are merely exemplary and are not intended to indicate that the described order is the only order in which the operations could be performed. One of ordinary skill in the art would recognize various ways to control power consumption of a driver device of a data link of electronic device as described herein. Additionally, it should be noted that details of other processes and structures described above with respect to FIGS. 1-10 are also applicable in an analogous manner to method 1100 described above with respect to FIG. 11. For brevity, these details are not repeated here.

Each power interface optionally includes a circuit unit, a wire, or a conductive node connecting to a respective power signal. The I/O interface 112 optionally includes a circuit unit, a wire, or a conductive node connecting to a respective input or output signal. In some embodiments, a driver device 150 of an electronic device is configured to communicate data in differential signals. Transmitter circuit 116 described in FIGS. 3-5 and 7-9 is duplicated to process the differential signals in the driver device 150, and the method 1100 is applied to control power consumption of the duplicated transmitter circuit 116 that process both signals in each differential signal in the driver device 150. For brevity, description is not repeated for differential signals.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described embodiments. The first electronic device and the second electronic device are both electronic device, but they are not the same electronic device.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A driver device, comprising:
   an input/output (I/O) interface configured to couple to a load device;
   a first power interface configured to provide a first power supply for transmitting data via the I/O interface;
   a transmitter circuit coupled to the I/O interface and to the first power interface, the transmitter circuit configured to be powered by the first power supply and to provide an output signal to the load device via the I/O interface in a transmitter mode; and
   a switching unit coupled to the first power interface, the switching unit configured to switch off the first power interface for the transmitter circuit in accordance with a determination, from the driver device, that the transmitter circuit is operating in a low power state, wherein the transmitter circuit has a power consumption level below a threshold power level in the low power state.

2. The driver device of claim 1, wherein the lower power state is enabled for the transmitter circuit when (i) no data is transmitted via the I/O interface in the transmitter mode and when (ii) the driver device operates in a receiver mode.

3. The driver device of claim 1, wherein the transmitter circuit includes a plurality of first transistors having first characteristic leakage currents that are greater than a first threshold leakage current.

4. The driver device of claim 3, wherein the switching unit includes one or more second transistors having second characteristic leakage currents that are less than a second threshold leakage current that is equal to or less than the first threshold leakage current.

5. The driver device of claim 1, further comprising a second power interface configured to provide a second power supply for transmitting the data via the I/O interface, wherein:
   (i) the transmitter circuit configured to be powered by the second power supply;
   (ii) the switching unit is coupled between the second power interface and the transmitter circuit; and
   (iii) the switching unit configured to switch on the second power interface for the transmitter circuit when operating in the low power state.

6. The driver device of claim 1, wherein:
   the transmitter circuit includes a plurality of first transistors, and the switching unit includes one or more second transistors;
   each second transistor of the switching unit is a P-type transistor, and is coupled between the first power supply and a respective current path of the transmitter circuit; and
   each second transistor is configured to control coupling of the respective current path to the first power supply of the first power interface.

7. The driver device of claim 6, wherein:
   each second transistor of the switching unit is further coupled in parallel to a respective third transistor, the respective third transistor being an N-type transistor;
   the respective third transistor has a third characteristic leakage current that is less than a threshold leakage current; and
   each second transistor and corresponding third transistor are configured to jointly control coupling of the respective current path to the first power supply.

8. The driver device of claim 1, further comprising:
   a termination detector coupled to the I/O interface, the termination detector configured to detect whether the load device is coupled to the I/O interface and to generate a connection signal indicating whether the load device is coupled to the I/O interface in the transmitter mode.

9. The driver device of claim 8, further comprising a controller coupled to the switching unit, the transmitter circuit, and the termination detector, the controller configured to control the switching unit based on the connection signal in the transmitter mode.

10. The driver device of claim 9, wherein the controller is configured to, in the transmitter mode:
    receive the connection signal;
    determine whether the load device is coupled to the I/O interface based on the connection signal;
    in accordance with a determination that the load device is coupled to the I/O interface, disable the low power state in the transmitter circuit; and
    in accordance with a determination that the load device is not coupled to the I/O interface, enable the low power state in the transmitter circuit.

11. The driver device of claim 1, further comprising:
    a receiver circuit coupled to the I/O interface, the receiver circuit configured to receive data from the load device in a receiver mode.

12. The driver device of claim 11, wherein the transmitter circuit is configured to operate in the low power state in the receiver mode, and the switching unit is configured to switch off the first power interface for the transmitter circuit in the receiver mode.

13. The driver device of claim 11, further comprising:
    a termination detector coupled to the I/O interface and to a third power interface, wherein:
    (i) the third power interface is distinct from the first power interface and is configured to provide the first power supply to the termination detector; and
    (ii) the termination detector is configured to switch off the third power interface and to provide an auxiliary termination resistor between the I/O interface and a second power supply in the receiver mode.

14. The driver device of claim 1, wherein:
    the transmitter circuit includes a plurality of pull-up transistors, each pull-up transistor being a respective P-type transistor and coupled to the switching unit in a respective current path in the transmitter circuit; and
    for each pull-up transistor, a respective gate of the respective pull-up transistor is configured to be coupled to the first power supply while no data is transmitted via the I/O interface in the transmitter mode.

15. The driver device of claim 14, wherein:
    the plurality of pull-up transistors includes a first pull-up transistor coupled in a current path of the transmitter circuit; and
    a second pull-up transistor is coupled to a gate of the first pull-up transistor and the first power supply, and is configured to couple the gate of the first pull-up transistor to the first power supply in the low power state.

16. The driver device of claim 1, wherein:
    the transmitter circuit includes a plurality of pull-down transistors, each pull-down transistor being a respective N-type transistor and coupled to a second power supply in a respective current path in the transmitter circuit; and
    for each pull-down transistor, a respective gate of the respective pull-down transistor is configured to be coupled to the second power supply in the low power state.

17. The driver device of claim 1, further comprising:
    a termination detector coupled to the I/O interface and to a third power interface, wherein the third power interface (i) is distinct from the first power interface, (ii) configured to provide the first power supply to the termination detector, and (iii) configured to be switched off in a receiver mode;
    wherein the termination detector includes an N-type transistor and a resistive unit, and when the N-type transistor is enabled, the resistive unit is configured to provide an auxiliary termination resistor between the I/O interface and a second power supply in the receiver mode.

18. An electronic device, comprising:
    an input/output (I/O) interface configured to couple to a load device;
    a transmitter circuit coupled to the I/O interface, wherein the transmitter circuit is configured to be powered by a first power supply and to provide an output signal to the load device via the I/O interface in a transmitter mode; and
    a switching unit coupled to the transmitter circuit, the switching unit configured to switch off a first power supply locally for the transmitter circuit in accordance with a determination, from the electronic device, that the transmitter circuit is operating in a low power state, wherein the transmitter circuit has a power consumption level below a threshold power level in the low power state.

19. The electronic device of claim 18, wherein the lower power state is enabled for the transmitter circuit when (i) no data is transmitted via the I/O interface in the transmitter mode and when (ii) the electronic device operates in a receiver mode.

20. A method for controlling power consumption of a driver device, comprising:
    determining that operation of a transmitter circuit satisfies one or more low power state criteria, wherein:
        the transmitter circuit is coupled to an I/O interface and to a first power interface, the I/O interface is configured to couple to a load device, and a first power interface provides a first power supply for transmitting data via the I/O interface; and
        the transmitter circuit is powered by the first power supply and provides an output signal to the load device via the I/O interface in a transmitter mode; and
    in accordance with a determination, from the driver device, that operation of the transmitter circuit satisfies one or more low power state criteria, switching off the first power interface for the transmitter circuit, wherein the transmitter circuit has a power consumption level below a threshold power level in a low power state associated with the one or more low power state criteria.

* * * * *